(12) United States Patent
Fairbanks

(10) Patent No.: US 10,477,287 B1
(45) Date of Patent: Nov. 12, 2019

(54) METHOD FOR PROVIDING ADDITIONAL INFORMATION ASSOCIATED WITH AN OBJECT VISUALLY PRESENT IN MEDIA CONTENT

(71) Applicant: Neal C. Fairbanks, Livonia, MI (US)

(72) Inventor: Neal C. Fairbanks, Livonia, MI (US)

( * ) Notice: Subject to any disclaimer, the term of this patent is extended or adjusted under 35 U.S.C. 154(b) by 0 days.

(21) Appl. No.: 16/444,787

(22) Filed: Jun. 18, 2019

(51) Int. Cl.
*H04N 21/854* (2011.01)
*H04N 21/462* (2011.01)
*H04N 21/81* (2011.01)

(52) U.S. Cl.
CPC ......... *H04N 21/854* (2013.01); *H04N 21/462* (2013.01); *H04N 21/812* (2013.01)

(58) Field of Classification Search
CPC .... H04N 21/80; H04N 21/854; H04N 21/462; H04N 21/812; H04N 21/8126; H04N 21/8547; H04N 21/858; H04N 21/8583; H04N 21/8586
See application file for complete search history.

(56) References Cited

U.S. PATENT DOCUMENTS

| | | |
|---|---|---|
| 5,561,708 A | 10/1996 | Remillard |
| 5,708,845 A | 1/1998 | Wistendahl et al. |
| 6,002,394 A | 12/1999 | Schein et al. |
| 6,496,981 B1 | 12/2002 | Wistendahl et al. |
| 6,636,237 B1 | 10/2003 | Murray et al. |
| 6,675,174 B1 | 1/2004 | Bolle et al. |
| 7,325,013 B2 | 1/2008 | Caruso |
| 7,653,921 B2 | 1/2010 | Herley |
| 7,769,708 B2 | 8/2010 | Caruso |
| 7,809,154 B2 | 10/2010 | Lienhart et al. |
| 7,870,592 B2 | 1/2011 | Hudson et al. |
| 7,895,325 B2 | 2/2011 | Van Vleet et al. |
| 7,962,367 B1 | 6/2011 | Fuisz et al. |
| 8,065,615 B2 | 11/2011 | Murray et al. |
| 8,073,194 B2 | 12/2011 | Lienhart et al. |
| 8,090,579 B2 | 1/2012 | DeBusk et al. |
| 8,255,279 B2 | 8/2012 | Fuisz et al. |
| 8,312,486 B1 | 11/2012 | Briggs et al. |
| 8,392,821 B2 | 3/2013 | DeMarco et al. |
| 8,418,198 B2 | 4/2013 | Cansler et al. |

(Continued)

FOREIGN PATENT DOCUMENTS

| | | |
|---|---|---|
| WO | 2012045317 A1 | 4/2012 |
| WO | 2017011084 A1 | 1/2017 |

*Primary Examiner* — Yassin Alata
(74) *Attorney, Agent, or Firm* — Howard & Howard Attorneys PLLC

(57) ABSTRACT

A system and method for providing additional information associated with an object visually present in media content when interacted with by a user on a user device is disclosed. An authoring tool imports media content at a default resolution and the media content is scaled so that the authoring tool and media content have a 1:1 correspondence for a coordinate grid to create interactive elements. The interactive elements are defined by element parameters. A portable package is created and distributed that includes the default resolution and element parameters. A request is received from the user device for the portable package along with device information. The portable package and the media content are delivered to the user device based on the request. A selection event is received and the element parameters are scaled based on the device information to determine if the selection event corresponds to the interactive element.

15 Claims, 39 Drawing Sheets

(56) References Cited

U.S. PATENT DOCUMENTS

| | | |
|---|---|---|
| 8,533,753 B2 | 9/2013 | Briggs et al. |
| 8,549,555 B2 | 10/2013 | Briggs et al. |
| 8,782,690 B2 | 7/2014 | Briggs et al. |
| 8,850,477 B2 | 9/2014 | Schein et al. |
| 8,893,173 B2 | 11/2014 | Briggs et al. |
| 9,189,818 B2 | 11/2015 | McClements, IV |
| 9,247,309 B2 | 1/2016 | Oztaskent et al. |
| 9,258,597 B1 | 2/2016 | Clayton |
| 9,596,515 B2 | 3/2017 | Witenstein-Weaver |
| 9,639,532 B2 | 5/2017 | Raichelgauz et al. |
| 9,705,728 B2 | 7/2017 | Bridges |
| 9,888,289 B2 | 2/2018 | Gross |
| 2003/0149983 A1 | 8/2003 | Markel |
| 2004/0109087 A1 | 6/2004 | Robinson et al. |
| 2005/0069225 A1 | 3/2005 | Schneider et al. |
| 2005/0137958 A1 | 6/2005 | Huber et al. |
| 2007/0124762 A1 | 5/2007 | Chickering et al. |
| 2008/0052750 A1 | 2/2008 | Grunnet-Jepsen et al. |
| 2008/0066136 A1 | 3/2008 | Dorai et al. |
| 2008/0126191 A1 | 5/2008 | Schiavi |
| 2008/0140523 A1 | 6/2008 | Mahoney et al. |
| 2009/0271819 A1 | 10/2009 | Cansler et al. |
| 2009/0276805 A1 | 11/2009 | Andrews, II et al. |
| 2011/0035382 A1 | 2/2011 | Bauer et al. |
| 2011/0052144 A1 | 3/2011 | Abbas et al. |
| 2011/0191699 A1 | 8/2011 | Cunningham et al. |
| 2012/0151347 A1 | 6/2012 | McClements, IV |
| 2012/0167145 A1 | 6/2012 | Incorvia |
| 2012/0206647 A1 | 8/2012 | Allsbrook et al. |
| 2013/0074139 A1 | 3/2013 | Cope et al. |
| 2013/0174195 A1 | 7/2013 | Witenstein-Weaver |
| 2014/0047483 A1 | 2/2014 | Fairbanks |
| 2014/0255003 A1 | 9/2014 | Abramson |
| 2015/0177940 A1 | 6/2015 | Trevino et al. |
| 2017/0017382 A1 | 1/2017 | Tobin et al. |

```xml
- <newShape>
      <userID>ben@vidco.com</userID>
      <shapeType>Custom</shapeType>
      <shapeName>Tommy Adaptive</shapeName>
      <shapeURL>https://usa.com/en?
            ctcampaign=871&ctkwd=tommy%&ctmatch=e&ctcreative=270273871668&cid=
            cpc:goo:usa:tommy%:e&ctadpos=1t1&ctplacement=&gclid=</shapeURL>
      <LogoFile>THlogo.png</LogoFile>
      <shapeDescription>Tommy Adaptive</shapeDescription>
      <shapeLogoUrl>http://www.media.com/Red5DBConnectPractice/ben@video.com/
            logos/THlogo.png</shapeLogoUrl>
      <ButtonName>Shop Now</Button Name>
      - <coordinates>
            <xStartPoint>-620</xStartPoint>
            <yStartPoint>-156</yStartPoint>
      </coordinates>
      - <multiPoint>
          - <point>
                <xVal>14</xVal>
                <yVal>393</yVal>
          </point>
          - <point>
                <xVal>622</xVal>
                <yVal>395</yVal>
          </point>
          - <point>
                <xVal>618</xVal>
                <yVal>64</yVal>
          </point>
          - <point>
                <xVal>19</xVal>
                <yVal>62</yVal>
          </point>
      </multiPoint>
      - <dimensions>
            <widthShape>608</widthShape>
            <heightShape>333</heightShape>
      </dimensions>
      <newPosition/>
      - <newPoints>
          - <pointShift>
                <moveTime>12.55</moveTime>
              - <points>
                  - <point>
                        <xVal>12</xVal>
                        <yVal>395</yVal>
                  </point>
                  - <point>
                        <xVal>620</xVal>
                        <yVal>397</yVal>
                  </point>
                  - <point>
                        <xVal>616</xVal>
                        <yVal>66</yVal>
                  </point>
                  - <point>
                        <xVal>17</xVal>
                        <yVal>64</yVal>
                  </point>
              </points>
          </pointShift>
      </newPoints>
      - <times>
            <startTime>12.55</startTime>
            <endtime>15.10</endTime>
      </times>
  </newShape>
</root>
```

FIG. 37

METHOD FOR PROVIDING ADDITIONAL INFORMATION ASSOCIATED WITH AN OBJECT VISUALLY PRESENT IN MEDIA CONTENT

BACKGROUND OF THE INVENTION

1. Field of the Invention

The invention generally relates to a system and method for providing additional information associated with an object visually present in media content when interacted with by a user on a user device.

2. Description of the Related Art

Various methods are known for interacting with media content to obtain information, such as providing limited services. Examples of such methods are disclosed in U.S. Pat. Nos. 6,002,394 and 8,850,477, both to Schein et al. These references disclose an invention practiced under WebTV®, hereinafter referred to as interactive TV. The interactive TV provides a television schedule and information guide, which allows interaction between a television viewer and information associated with a television program from an on-line internet provider. The information is only unique to the program the viewer chooses to select. However, this method only provides superficial information to the viewer and the information is not being directly associated with objects in the media content.

Other methods allow for creating hot spots for an object within media content and retrieving information associated with the object upon selecting the hot spot. However, some of the methods known to those skilled in the art require editing of individual frames of the media content, which requires a significant outlay of the time and effort to establish such methods. Illustrative methods are shown in U.S. Pat. Nos. 5,708,845 and 6,496,981, both to Wistendahl et al., which disclose creating hot spots for objects present in media content and associating information for the objects to the hot spots. This allows a user to select the hot spot to access the associated information. Each of the '845 and the '981 patents requires editing of individual frames of the media content to create the hot spots for the objects. It is well known to those skilled in the art to define hot spots using positional data having two or three coordinates. However, one issue presented in creating these hot spots is interleaving it with the media content. Since the frames are passing at a rate of 30 frames per second, it would take considerable time and effort even for a most skilled editor. This is a major burden to be overcome in providing this functionality to users and viewers in a cost effective manner.

There have been other attempts to provide such interactivity to objects in media content by disposing, over the media content, a layer having a physical shape that tracks the object in the media content during playback and detecting a click within the physical shape. As one example, U.S. Pat. No. 9,888,289 is for a "Liquid Overlay for Video Content" and provides interactivity through tags that are overlaid on the video. The tags are provided in an interactive content file that overlies or floats over the objects in the video when the video is played and associated information is retrieved if the tag is selected. Such systems require the tags to be overlaid which can result in large files if there are numerous objects or if it is a long video. Another drawback is that searching and loading the floating overlies as the video progresses can result in slower performance. The layer had to be attached to the media content and the player to provide additional "front-end" processing. Thus, this prior attempt could not instantaneously provide the additional information to the end-user unless the physical shape was positioned in a layer over the object. Still another drawback is that these external layers do not integrate well into the players or viewers, because they do not allow for layer, so that it takes additional resources to integrate the layer. The additional resources consume bandwidth and many content providers will not allow such layers.

Other approaches are shown in United Patents Patent Application Publications 2014/0047483 and 2015/0177940. Each of these methods define object parameters for objects present in media content and the parameters are stored in a database separate from the media content and separate from the device that is playing the media content. When the user interacts with the video, in order to determine if the object is located at that time and location, it is necessary to communicate with the database. Still another approach is shown in WO2017/011084, and corresponding United States Patent Application Publication No. 2017/0017382, which discloses a system and method for interaction between touch points on a graphical display, and specifically for the selection of objects while viewing media content. Such systems have drawbacks if the bandwidth is limited between the user device and the database or if a content provider will not allow access outside of its network. If millions of users are selecting objects at nearly the same time, the bandwidth to make the round trip is too extensive and performance is poor. The performance is further limited if analytics are being transmitted at the same time. Further, the systems tend to be computationally intensive which results in the implementation being limited or difficult.

BRIEF SUMMARY

The subject invention provides a method for providing additional information associated with an object visually present in media content when interacted with by a user on a user device and a system for performing the same. The method comprises the steps of receiving media content in an authoring tool that is capable of receiving input from an author to create interactivity for objects visually present in the media content. A default resolution is defined to import the media content into the authoring tool. Next, the media content is scaled within the authoring tool to display at the default resolution so that the authoring tool and media content have a 1:1 correspondence for a coordinate grid.

An interactive element is established that corresponds to an object visually present in the media content. The interactive element is defined by element parameters, which comprise a plurality of (X, Y) coordinates that define a shape and an object time corresponding to a duration that the shape is present at the coordinates. Object metadata is established for the object and associated with the interactive element. The authoring tool then creates a portable package that includes the default resolution, element parameters and the object metadata and the portable package is distributed so that it is retrievable by the user device in response to a request from the user device.

The request is received from the user device for the portable package along with device information including at least one of a type of the user device, a device orientation, a device resolution or combinations thereof. The portable package and the media content are delivered to the user device based on the request.

Next, a selection event is received from within the customer viewer that comprises a selection time and a selection coordinate. The element parameters for the interactive element are scaled based on the device information, if necessary. The portable package is parsed to determine whether the selection time corresponds to the object time, and if the selection time corresponds with the object time, the portable package is further parsed to determine whether the selection coordinate is within the scaled element parameters. If the selection coordinates are within the scaled element parameters, the object metadata is retrieved such that the additional information is displayable to the user on the user device.

In another embodiment of the subject invention, a method for creating interactive media content having additional information associated with an object visually present in media content is disclosed. The method comprises the steps of receiving media content in an authoring tool that is capable of receiving input from an author to create interactivity for objects visually present in the media content when the media content is played and defining a default resolution to import the media content into the authoring tool. Next, the media content is scaled within the authoring tool to display at the default resolution so that the authoring tool and media content have a 1:1 correspondence for a coordinate grid. Interactive elements corresponding to an object visually present in the media content are established and defined by element parameters comprising a plurality of (X, Y) coordinates that define a shape and an object time corresponding to a duration that the shape is present at the coordinates. Object metadata for the object is established and associated with the interactive element. The authoring tool creates a portable package for distribution that includes the default resolution, element parameters and the object metadata such that when the portable package is accessed through a customer viewer, the object metadata will retrieve the additional information about the object.

The subject invention discloses yet another embodiment of a method for providing additional information associated with an object visually present in media content when interacted with by a user on a user device. The method comprises the steps of receiving a request for a portable package and receiving device information including at least one of a type of the user device, a device orientation, a device resolution or combinations thereof. The portable package includes an interactive element corresponding to an object visually present in the media content and object metadata that is associated with the interactive element. The interactive element is defined by element parameters comprising a plurality of (X, Y) coordinates that define a shape and an object time corresponding to a duration that the shape is present at the coordinates. The portable package and the media content are delivered to the user device based on the request. The method includes receiving a selection time and a selection coordinate for a selection event that occurred within a customer viewer and then scaling the element parameters for the interactive element based on the device information. The portable package is parsed to determine whether the selection time corresponds to the object time, and if the selection time corresponds with the object time, further parsing the portable package to determine whether the selection coordinate is within the element parameters. If the selection coordinates are within the element parameters the object metadata is retrieved such that the additional information is displayable to the user on the user device.

The subject invention overcomes the drawbacks that are present in the related systems. First, the subject invention is able to scale the interactive elements and adjust to different device types, resolution, and orientation so that the interactive elements remain aligned with the objects in the video. Second, the subject invention deploys fully stand-alone portable packages that can provide interactivity without having to communicate outside of a specified network. The subject invention also provides for automatic creating and tracking of objects within a smaller field of view which improves accuracy and shortens computational time and lessens computations requirements. In other words, the subject invention successfully provides interactive media content that consumes less bandwidth. The subject invention also simplifies the creation of the interactive elements which allows for longer video sequences to be made interactive and/or more objects to be made interactive.

BRIEF DESCRIPTION OF THE SEVERAL VIEWS OF THE DRAWINGS

Other advantages of the present invention will be readily appreciated as the same becomes better understood by reference to the following detailed description when considered in connection with the accompanying drawings wherein:

FIG. 37 is a representation of a representative portable package that includes interactivity;

DETAILED DESCRIPTION OF THE INVENTION

Referring to the Figures, wherein like numerals indicate like parts throughout the several views, a system and a method for creating and distributing portable packages that provide additional information associated with objects present in media content to a user on a user device are shown generally throughout the Figures. In general, the portable package provides interactive elements 101 for objects present in the media content, such as a video file, as will be described below. The user is able to access the information about the object that is visually present in the media during playback of the media. It is to be appreciated that the terms "user" and "viewer" may be used interchangeable to refer to the user or viewer that is viewing the media content on the user device. The objects may be placed in the media content for brand awareness, which is typically referred to as product placement or integration. Examples of product placement include placing the product in advertisements or television programs and advertising at venues hosting events such that their advertisements are displayed during the broadcast of the event.

Traditionally, the user watching the media content was unable to access information associated with the object present in the media content. For example, if a character in a movie is wearing a particular outfit and the user is interested in the outfit, the user is unable to obtain information associated with the particular outfit by interacting with the device. Instead, the user would have to try and locate the object themselves and could not do so through interacting directly with the media content.

Those skilled in the art shall recognize that the type of object is not limited, and may be any object in the media content. The object may be defined as any logical item in the media that is identifiable by the user. Examples of suitable objects include, but are not limited to, clothes, food items, furniture, corporate logos, vehicles, locations, buildings, and the like. Each one of these objects may have information associated with the object, such as, but not limited to, manufacturer, price, reviews, availability or the like. If the object is a location, then the associated information may include, without being limiting, population, average weather conditions for the time of year, etc.

Figure 1:
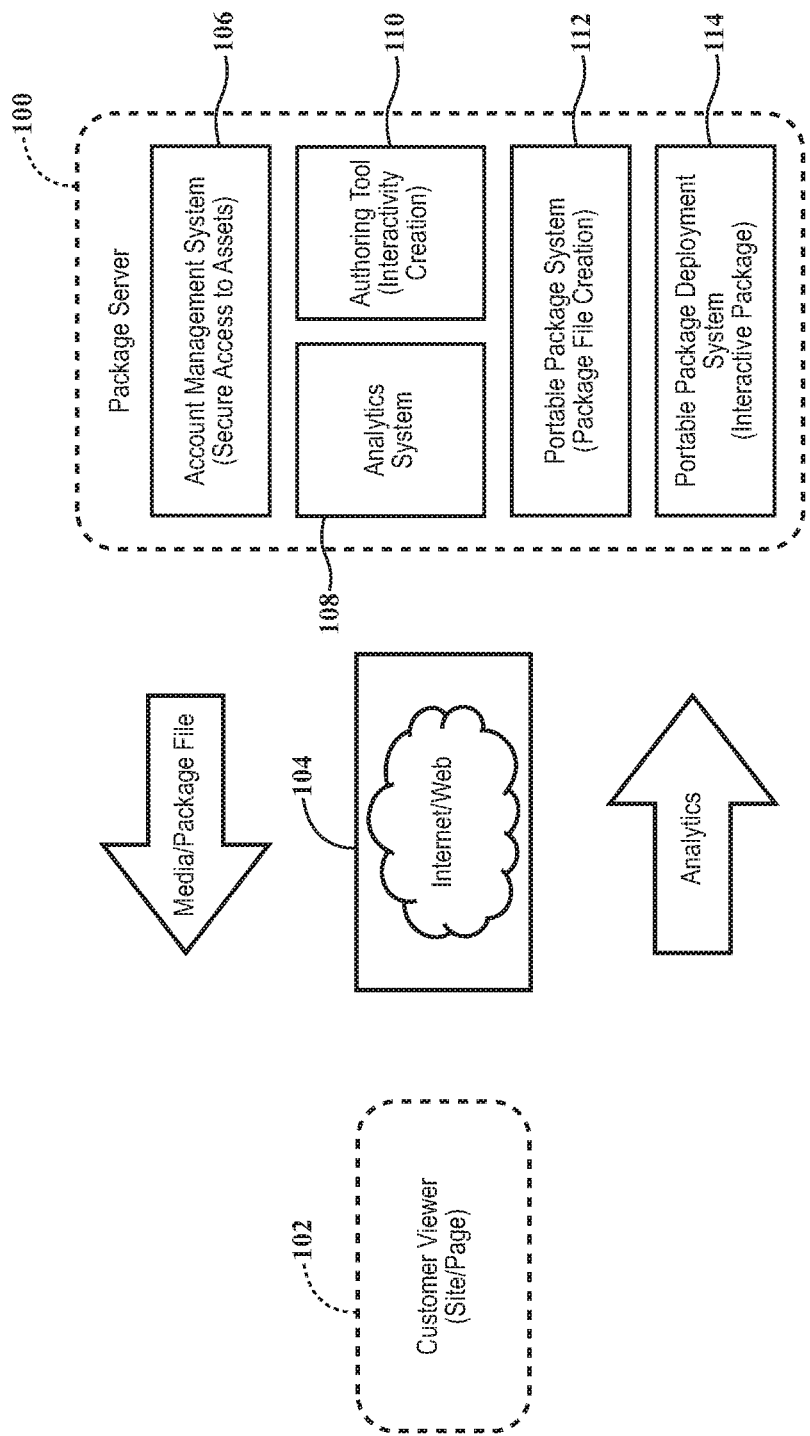
FIG. 1 is a schematic representation of one embodiment of a system for creating and distributing portable packages that provide information associated with an object present in media content to a user on a user device.

One embodiment of the system is shown in FIG. 1, which includes a package server 100 and a customer viewer 102 that are in communication over the Internet 104. The media content could be provided from the web server. The media content may be temporarily loaded into the customer viewer 102, such as in cache, or stored locally on the user device. Examples of the media include, but are not limited to, any recorded video, advertisements, recorded or live television programs, movies, sporting events, news broadcasts, and streaming videos.

The user may receive the media in or on various types of user devices such as smart phones, laptop or desktop computers, tablets, televisions, and the like. Regardless of the specific device, the customer viewer 102 displays on the user device and the customer viewer 102 needs to be able to accept and receive inputs or selections from the user through or with the user device. It is be appreciated that the user device includes a processor that executes code representing the customer viewer 102 and one of ordinary skill would understand how to write such code so that additional disclosure is not required. As would be further understood by one of ordinary skill in the art, the user device generally also includes, although not shown in the Figures, memory (RAM, ROM), storage media, and a display.

The customer viewer 102 is displayed on the display and is software that is being executed or processed by the processor and memory as is well known. The customer viewer 102 is typically written in accordance with industry standard specifications, such as HTML5, programming for java script, or the like depending on the device or browser that loads the customer viewer 102. The subject invention extends and enhances these specifications to provide the interactivity so that it is useable at low bandwidth and without having to access remote databases for interactivity. As will be described below, the user is able click, or select, in the customer viewer 102 in the media content through the user device.

The package server 100 includes an account management system 106, an analytics system 108, an authoring tool 110, a portable package system 112, and a portable package deployment system 114. In this embodiment, the package server 100 transmits the media content and the package file to the customer viewer 102.

Transmission of the media content may be accomplished by satellite, network, Internet 104, or the like. In the example shown in FIG. 1, the media content is transmitted through a web server. The media content may be streamed such that it is continuously received by and presented to the user while being continuously delivered by a content provider. The customer viewer 102 loads the package file and it is executed or parsed as the customer viewer 102 displays and/or plays the media content. In other words, the package file works with industry standard specifications for the customer viewer 102 to provide operability. The customer viewer 102 may be delivered to the device or it may be integrated into the user device for playing the media content such that the media content is viewable to the user. Alternatively, the customer viewer 102 could be provided by a third party, such as the content provider. Examples of the customer viewer 102 include, but are not limited to, Adobe Flash Player or Windows Media Player, and the like. The media content may be viewed by the user on a visual display, such as a screen or monitor, which may be connected or integrated with the user device.

Figure 2:
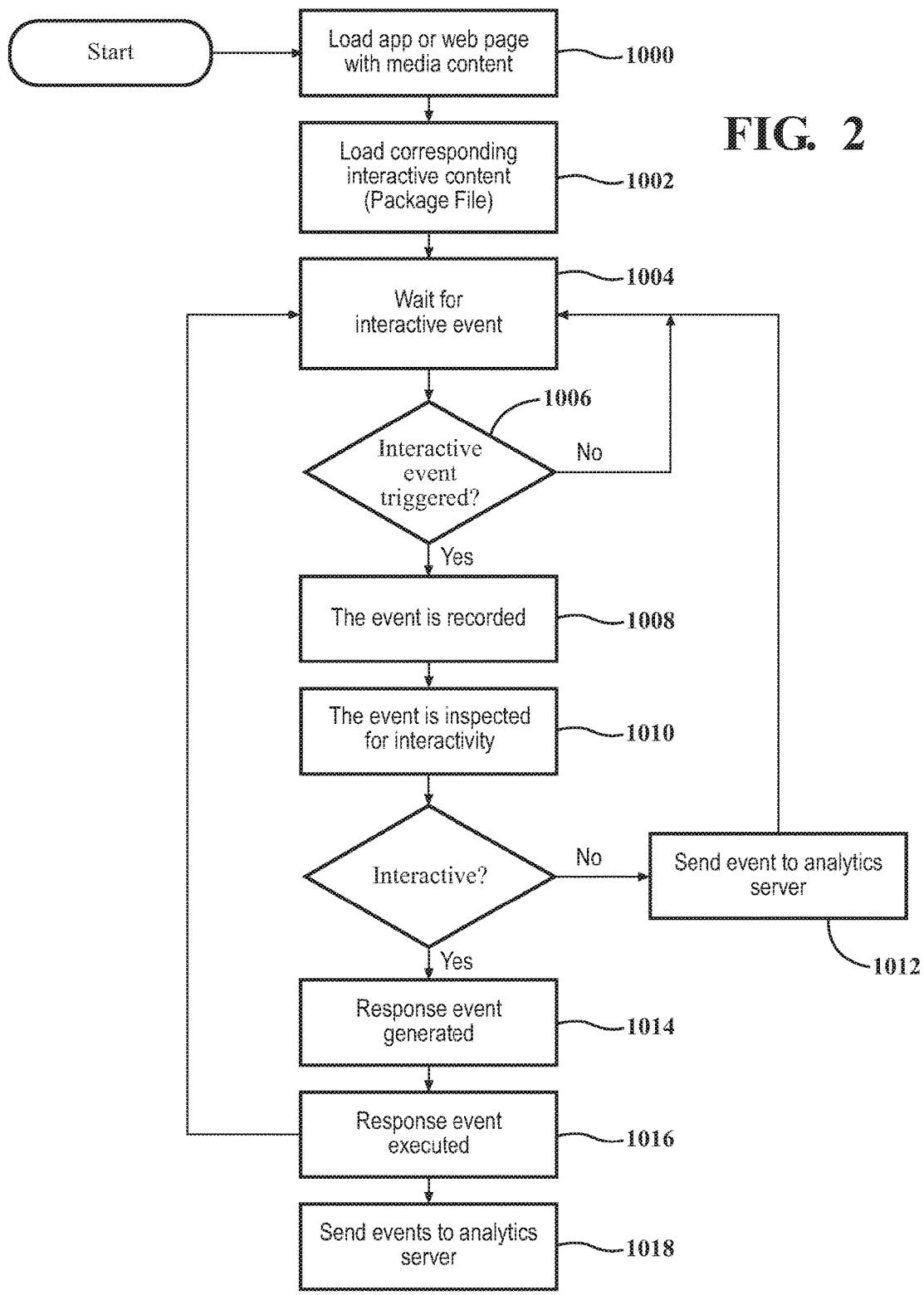
FIG. 2 is a flow chart of one embodiment for accessing media content with interactivity from the user device.

Referring to FIG. 2, as one example, the user may receive an email containing an advertisement on the user device. The user clicks on the advertisement and a browser opens, as in Step 1000, which loads an application or web page with media content. Embedded within the advertisement is information about the video file and the package file that are to be called and retrieved in order to have interactivity, as in Step 1002. Next, in Step 1004, the system waits for an interactive event, such as input or selection by the user and determines if the interactive event has been triggered in Step 1006. If no interactive event has been triggered, the process returns to Step 1004. If the interactive event is triggered, the process proceeds to Step 1008 to record the event. In Step 1010, the event is inspected for interactivity, which will be described below. Next, if the event was not interactive, the event may be sent to the analytics servers in Step 1012. If the event was interactive, a response event is generated in Step 1014, and a response event is executed in Step 1016. Finally, the process may send the event to the analytics server in Step 1018.

Figure 3:
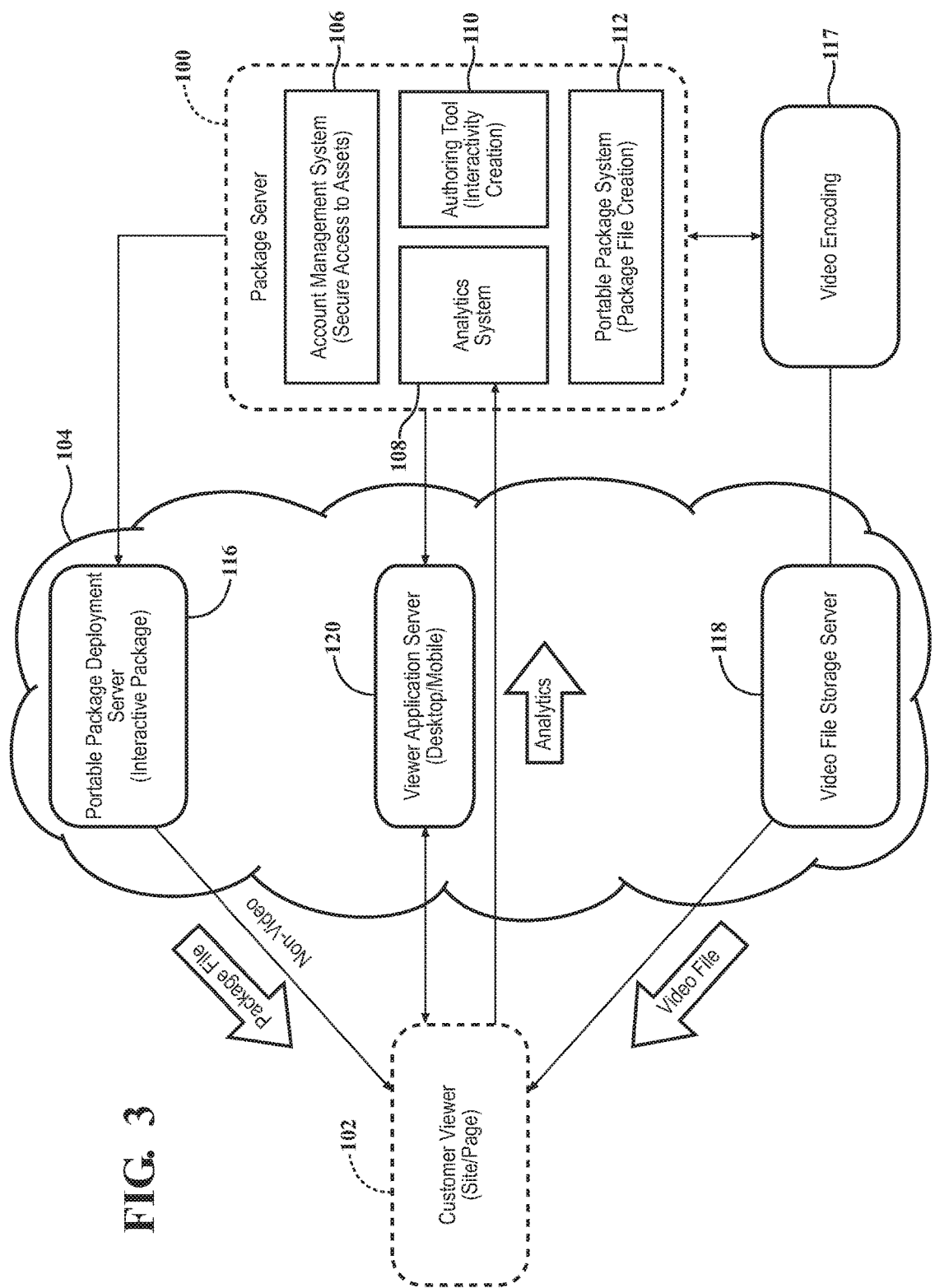
FIG. 3 is a schematic representation of another embodiment of a system for creating and distributing portable packages that provide information associated with an object present in media content to a user on a user device.

Another embodiment of the system and method is shown in FIG. 3, which is similar to FIG. 1 and has similarly identified elements. FIG. 3 differs in that a portable package deployment server 116 and a video file storage server 118 are separate from the package server 100. The portable package deployment server 116 receives the portable package from the package server 100. The portable package may reside on the deployment server 116 until it is needed at the customer viewer 102. The portable package includes the package file which will be discussed below. The media may be stored separately from the package file until it is accessed through and loaded into the customer viewer 102. The deployment server may be connected to the package server 100 via the Internet 104. The embodiment shown in FIG. 3 also includes a viewer application server 120 that may provide the customer viewer 102 to display the video and, optionally, execute the package file.

Generally, when the user device loads the web browser or application, device information or parameters are provided to the customer viewer 102 or the viewer application server 120. The device information or parameters may include the type of device that will receive the media content and the device resolution that the media content will be displayed. In order for the interactive elements 101 to correspond with objects when displayed according the device parameters, the interactive elements 101 needs to be scaled, which will be described below. Thus, the customer viewer 102 or the viewer application server 120 receives the device parameters and scales the interactive elements 101 to correspond to the device parameters. Alternatively, the viewer application server 120 can provide the customer viewer 102 to the user device, if none is present on the user device or if a specific customer viewer is needed, and the customer viewer 102 performs the scaling.

In one embodiment, when the video is called to the customer viewer 102, the package file in its entirety, is deployed to the player. This allows all interactivity requirements to reside in the player through the package file, eliminating the need for connecting to any server component for interactivity. This streamlined process enables very efficient playback of the media content.

In order to allow the subject invention to be most effectively distributed, any of the components necessary for the video to be interactive are deployed and/or saved in a pre-determined public server location. For example, this may include the desired customer viewer, the encoded video files, and the condensed portable package, which are to be deployed when the customer viewer 102 is activated. In a typical deployment, the customer viewer 102 is accessed via an iframe script implemented on a web page. The iframe script consists of parameters designed to support certain specifications such as video container size, pre-start image display, auto-play conditions, etc. Included in the iframe script are security features and configuration elements that tell which type of encoded video file and package file to deploy.

Figure 4:
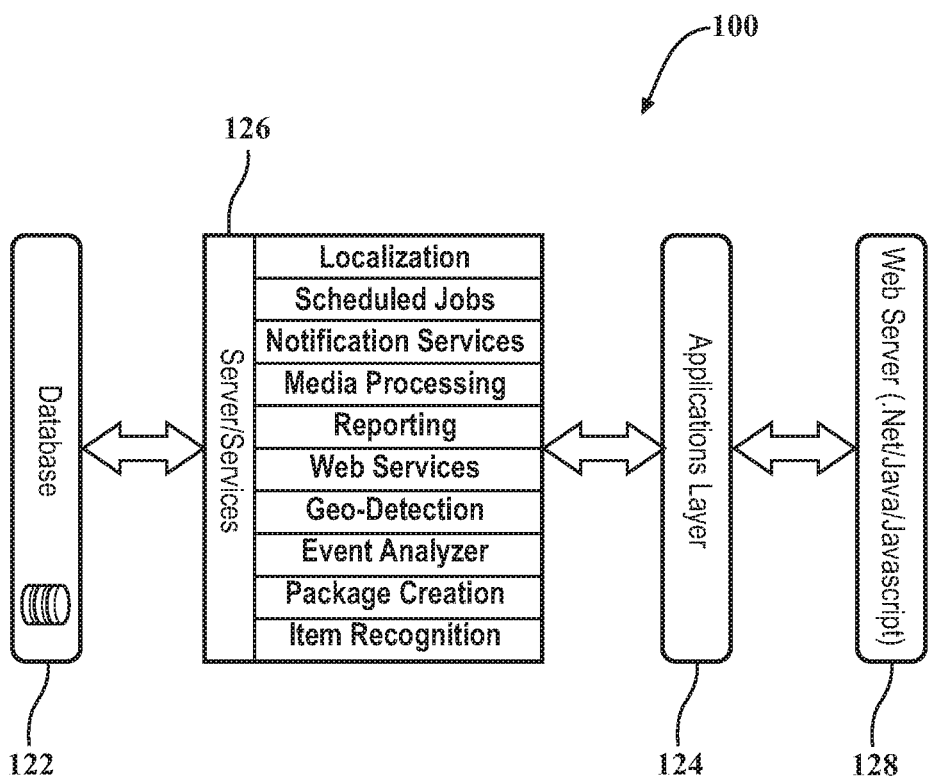
FIG. 4 is a schematic representation of layers utilized with a package server according to the subject invention.

Referring to FIG. 4, the package server 100 may include a database 122, an applications layer 124, a services layer 126, and a web server 128. The database 122 stores business rules, response rules, instructions and/or pointer data for enabling interactive and event driven content. The business and response rules may be based on the selection habits of the user and can provide feedback on how successful a marketing campaign was and/or what should be done next in the business. The database 122 may be comprised of multiple databases. The applications layer 124 and the services layer 126 may include localization, scheduled jobs, notification services, media processing, reporting, web services, geo-detection, event analyzer, package creation, and item recognition.

Localization determines the location of the user device based on an IP address, delivers appropriate interface language, and records appropriate date/time/location as part of analytics. Scheduled jobs may include basic database 122 housekeeping and analytics updates. The notification services generate response messages for completed jobs, completed uploads/encodes, etc. Media processing is a video data processing engine that supports multiple output streams to support various different platforms. Reporting is principally associated with an analytics reporting engine and management reporting engine. The web services are service handlers designed to support API connectivity to external systems. Standard web services are designed to support web based interfaces. Geo-detection refers to detection engines designed to report general location for a requesting user in order to enable localization and appropriate analytical data reporting. Event Analyzer creates events used in the portable package for appropriate response to requesting/responding user inputs, i.e. what happens when someone clicks on or off of the object.

The package creation process creates object mapping for the portable package and is used in conjunction with selection events to provide appropriate responses when requesting/responding when the user makes a selection. The item recognition process (or artificial intelligence or predictive coding) creates shapes based on object recognition and is used in conjunction with events to center and follow shapes throughout the video sequence. The item recognition process may also store shape elements and scans for reappearance of the shape.

The web server 128 is responsible for communication of events and actions between the package server 100 and user applications, i.e. customer viewer 102, via the GUI and/or event area of the web server 128. The web server 128 may include components which may be used to communicate with one or more computing platforms and/or user devices remotely over a network.

Although not shown, one of skill in the art would appreciate that an editing device, such as a computer, or the like, is connected to the package server 100 to execute the authoring tool 110. As one example, the authoring tool 110 is a software program that is integrated in the editing device and may reside on the package server 100. More specifically, the authoring tool 110 can be based on a .NET framework. Alternatively, the authoring tool 110 could be based on a C# framework. It is to be appreciated that the authoring tool 110 could be located remote from the package server 100 without deviating from the subject invention.

The media content server (or video file storage server 118) may be in communication with the package server 100 and a portable package deployment server 116 may be in communication with the package server 100. The package server 100 sends and receives signals or information to the portable package deployment server 116 and the video file storage servers 118. However, other configurations and content distribution networks may be used without deviating from the scope of the subject invention.

In one embodiment, the media content is provided to the authoring tool 110. The media content may be provided from the video file storage server 118 or any other source so that it can be used in the authoring tool 110. In another embodiment, the media content is stored in the video file storage server 118 after being provided to the authoring tool 110. In yet another embodiment, the media content is downloaded to the authoring tool 110 such that the media content is stored to the authoring tool 110 itself. The authoring tool 110 utilizes an encoding engine, such as a video encoding engine 117, to encode or format the media content to one standardized media type which is cross-platform compatible and creates media content for the various types.

The method includes the step of establishing element parameters associated with the object. The element parameters include object time and object shape data associated with the object. In one embodiment, an author uses the authoring tool 110 to establish the element parameters. In other embodiments, the authoring tool 110 may use item recognition processes to establish the element parameters, which will be discussed further below.

Figure 5:
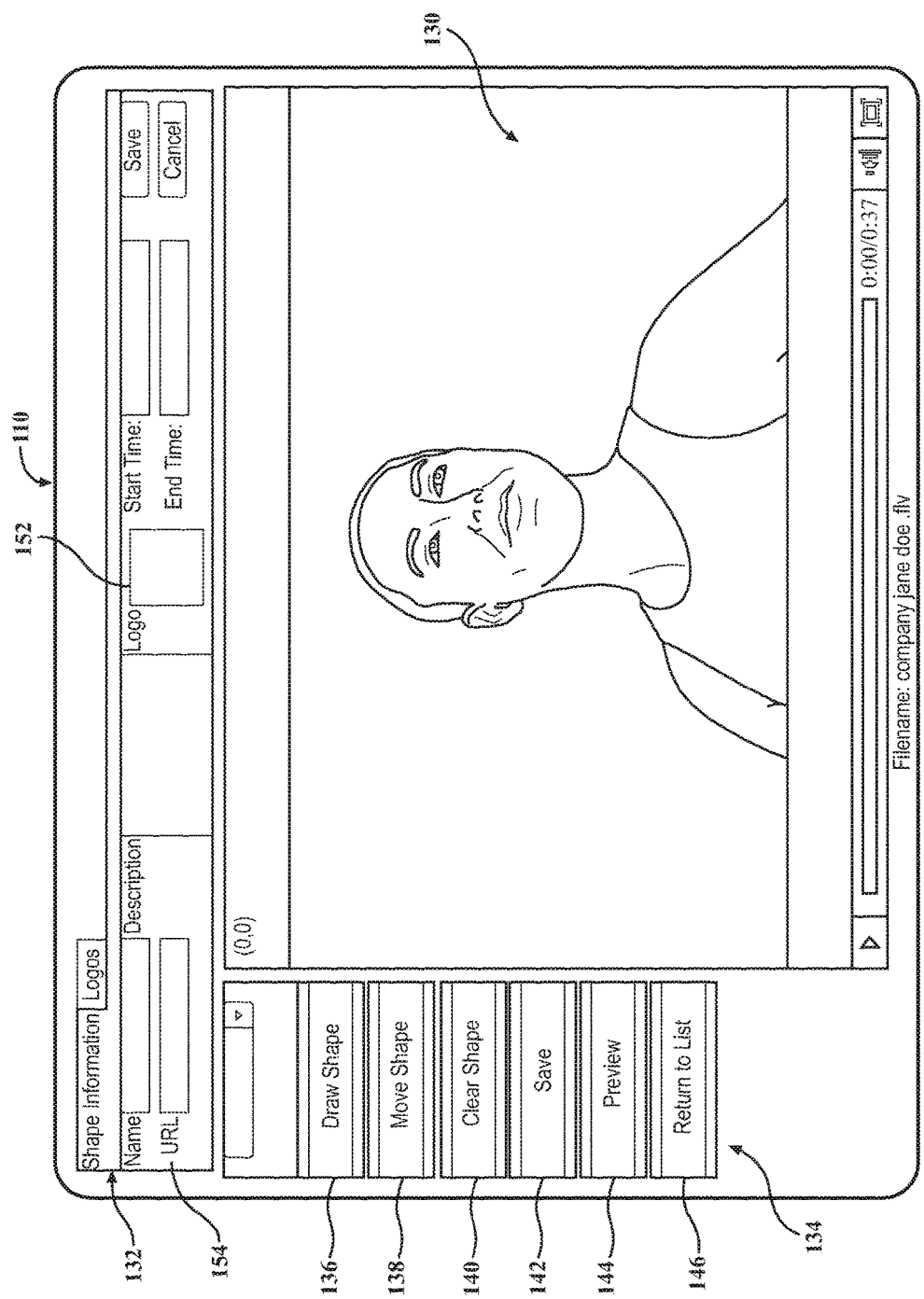
FIGS. 5-18 are illustrations of one embodiment of an authoring tool for creating interactive elements that correspond to objects in the media content.

Referring to FIG. 5, one embodiment of the authoring tool 110 is shown. The authoring tool 110 has an editing panel 130, an information panel 132, and a command panel 134. The editing panel 130 displays the media content and is used to create and define the element parameters associated with the objects. The information panel 132 allows information about the object to be input and linked with the element parameters. The command panel 134 includes operations such as draw shape 136, move shape 138, clear shape 140, save 142, preview 144 and return to list 146. The element parameters are established by defining a shape 148 in relation to the object using the draw shape command 136. The shape does not need to correspond completely with the object. In other words, the shape may surround the object with excess space between an edge of the object and the edge of the shape. Alternatively, the shape may be drawn only in relation to parts of the object, i.e. a left side of a jacket and a right side of a jacket. A plurality of shapes 148 may also be drawn. In one example, the plurality of shapes are drawn for various objects. In another example, the plurality of shapes are defined in relation to one single object. The step of establishing element parameters does not require accessing individual frames of the media content. When the shape is drawn, individual frames of the media content need not be accessed or manipulated.

Figure 6:
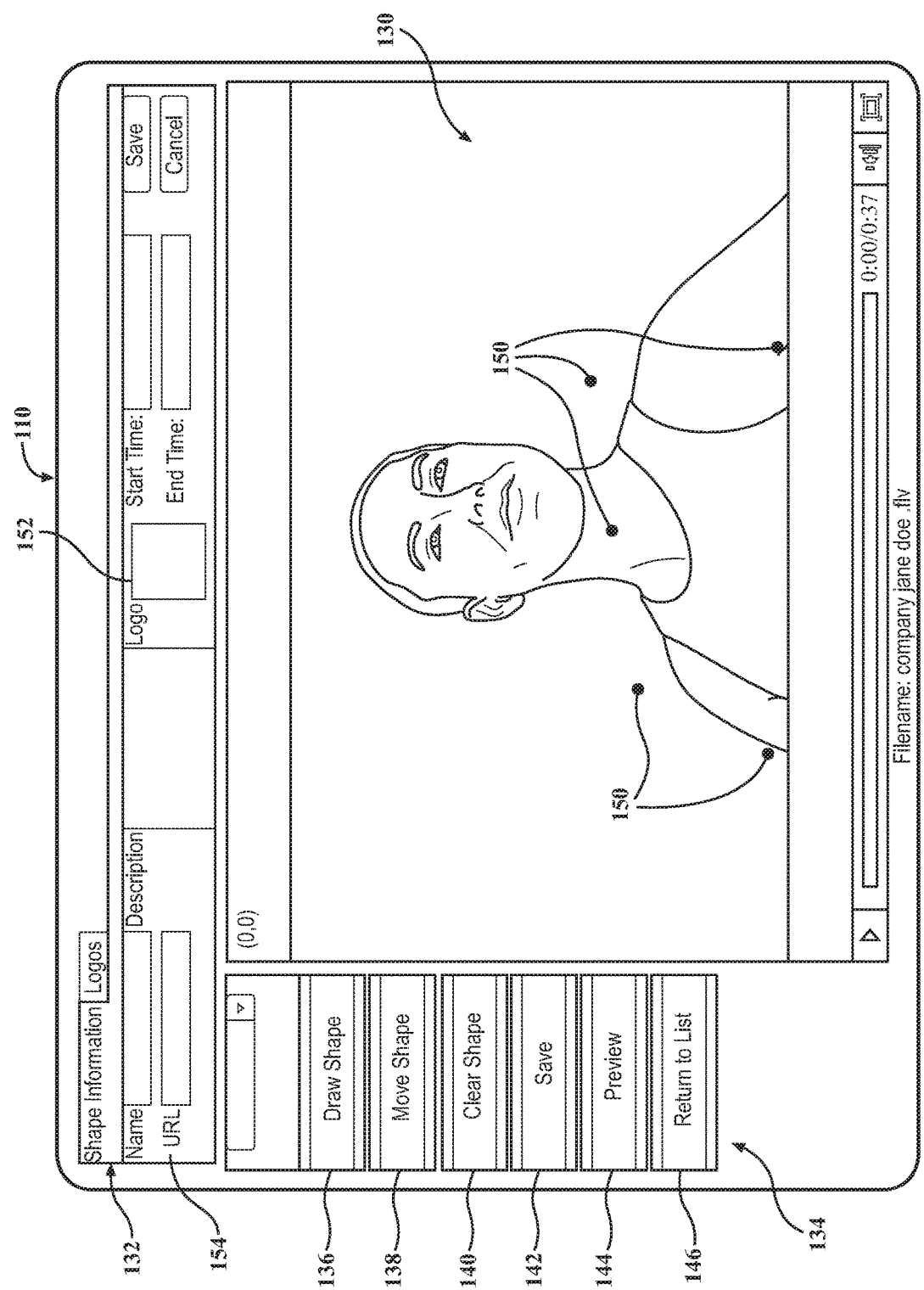
Figure 7:
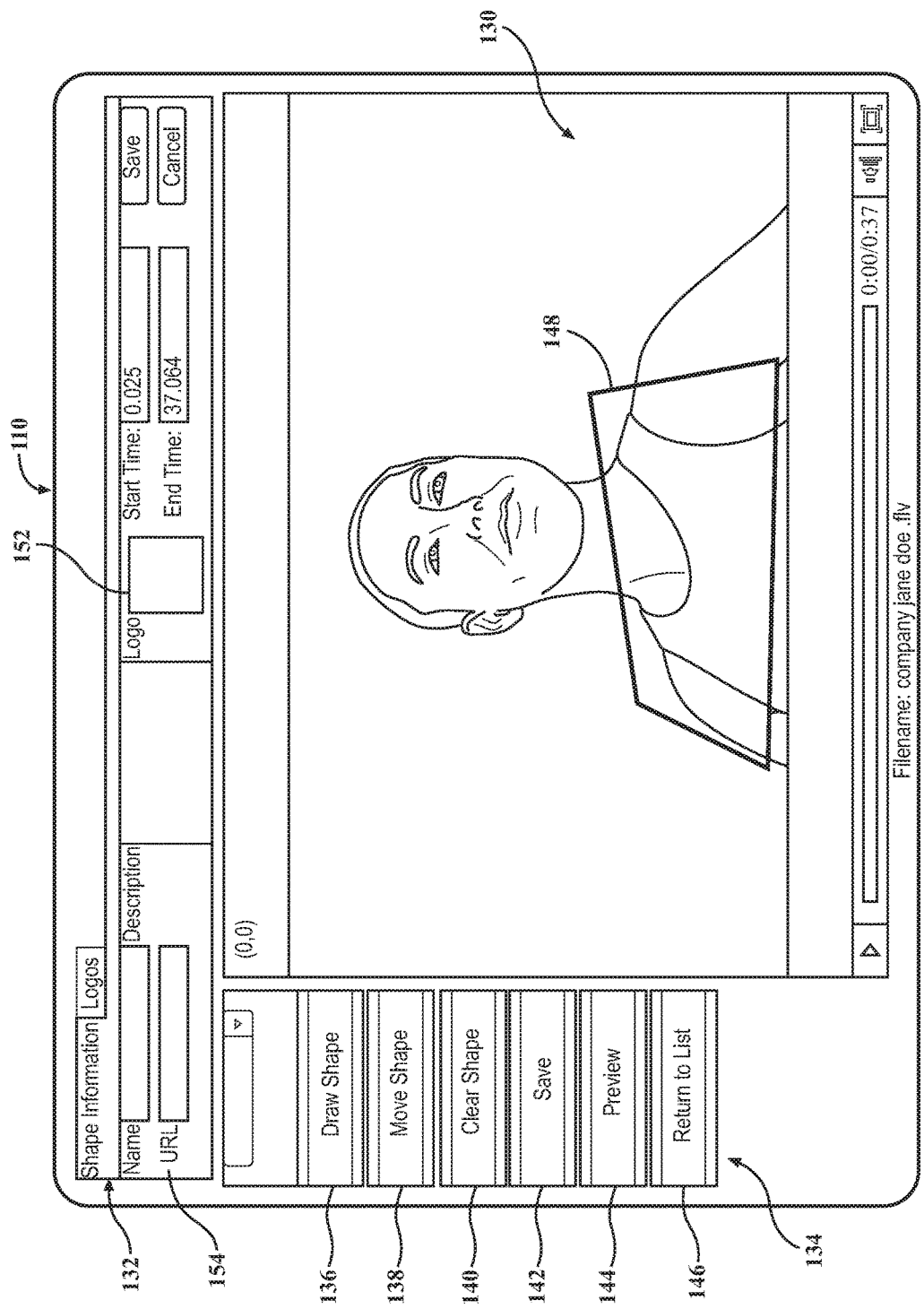

Referring to FIG. 6, the next step is to draw the shape 148 that surrounds the desired object being displayed during the video playback. This is done by selecting the "Draw Shape" command 136, inserting points (vertexes) around the desired object. The object in FIG. 6 corresponds to the tank top in the video. Once all points have been inserted, a "Close Shape" command is selected. The authoring tool 110 will automatically close the shape and draw connecting lines between each inserted point, creating an element boundary (or shape 148), which is shown in FIG. 7. This establishes the element parameters associated for the given object with the video file.

The creation of the interactive element 101 is based on setting pick points 150 for shapes that correspond to the object in the video based on an X-Y axis in the authoring tool 110. Each pick point 150 is defined with an (X, Y) location. Once the pick points 150 are created, lines are created between two of the points. The element boundary 148 or shape has an area based on the vertices. The following are non-limiting, example equations that may be used to determine line slope and Y-intercept formulas:

Line Slope: slope of the Line $(Y2-Y1)/(X2-X1)$

Line Y Intercept: Gets the y intercept of a Line $[Y1-(LineSlope*X1)]$

Figure 8:
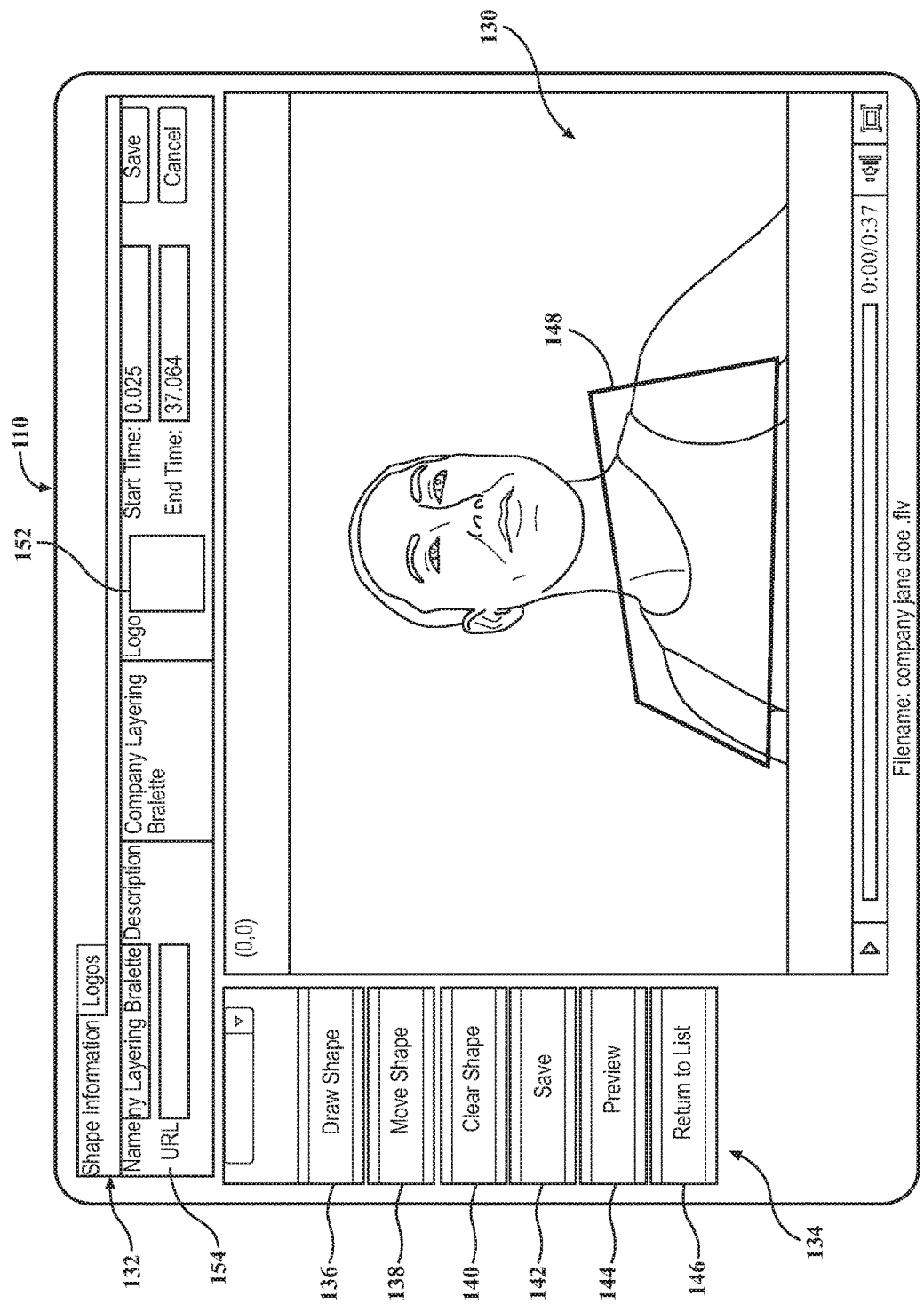

Get Line Segments Intersect: gets the Point where two Lines intercept $x=[(A.yIntercept-B.yIntercept)/(A.LineSlope-B.LineSlope)*-1]$ $y=A.LineSlope*x+A.yIntercept$ After that the element boundary 148 has been created, referring to FIG. 8, object metadata or additional information for this interactive element 101 is added in the information panel 132, such as name and description. Timing metadata (or object time) is also created that includes the start/end time for this interactive element 101. The timing metadata can be created by the authoring tool based on starting and stopping the video or manually entered.

Figure 9:
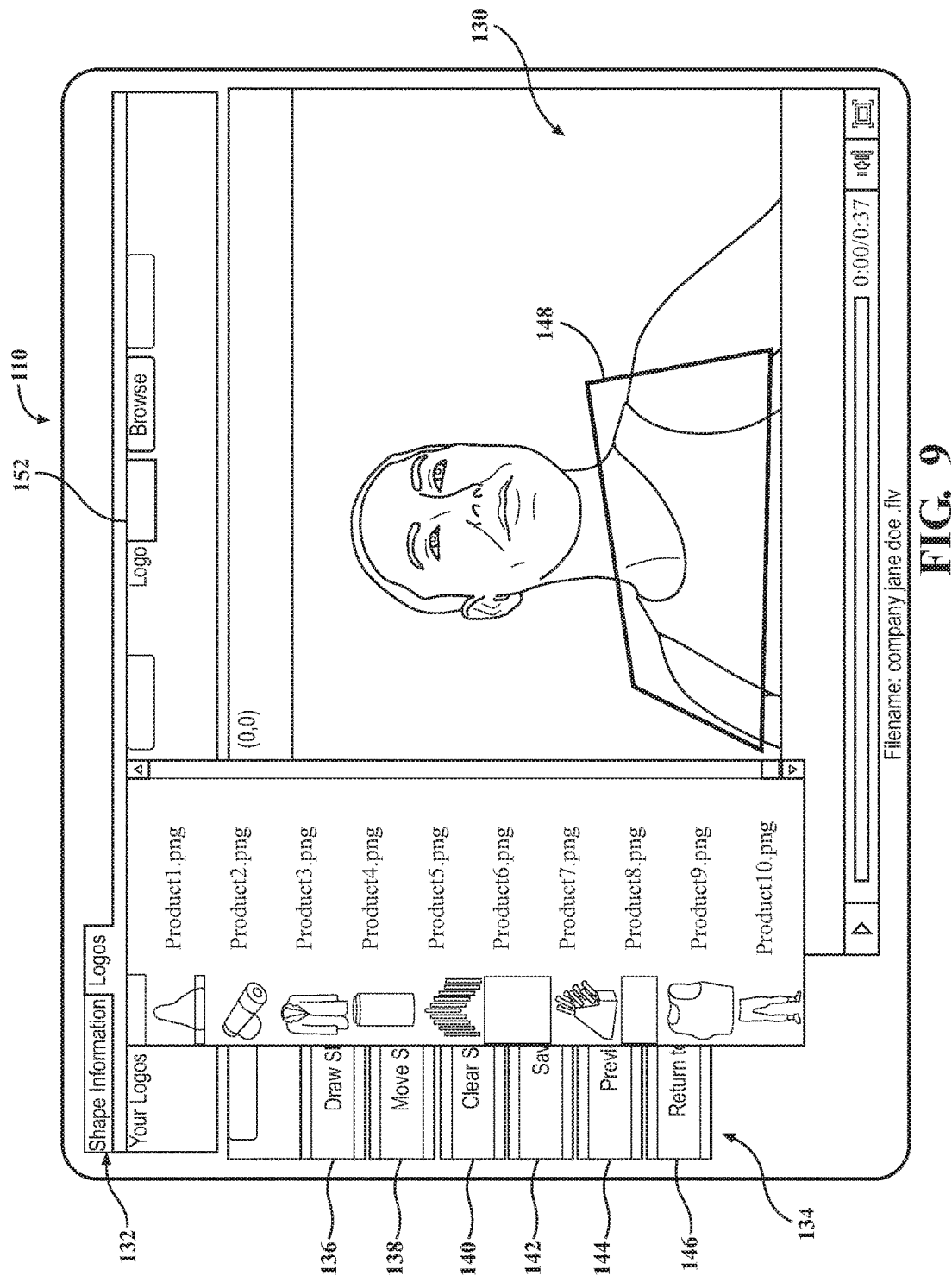
Figure 10:
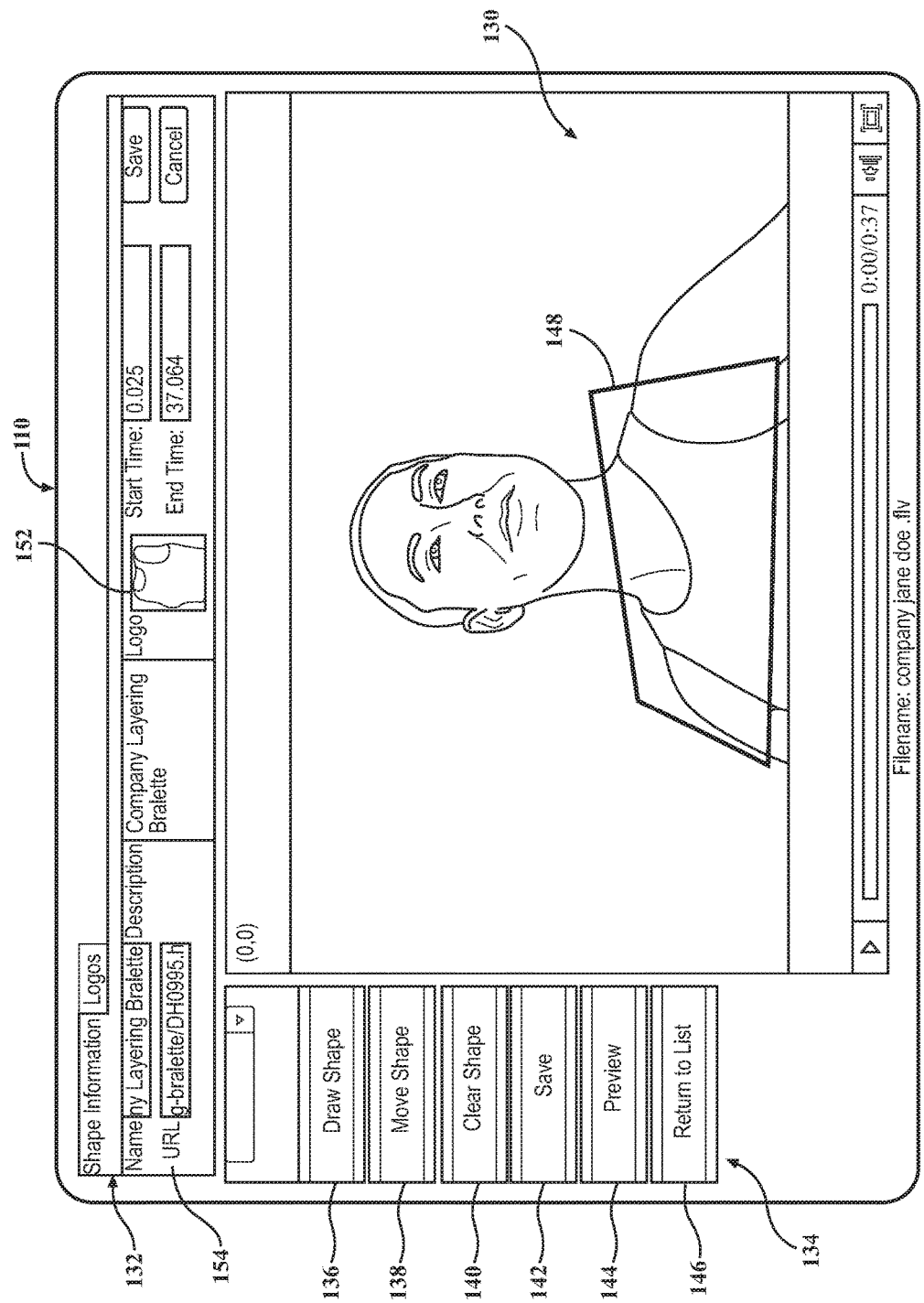

In FIG. 9, a display logo 152 (when active) is selected for the object (or product) in the video file. A landing URL 154 may be input as object metadata to be available, as shown in FIG. 10, in response to triggering the interactive element 101. This additional information may include advertising information, such as brand awareness and/or product placement-type advertising and may be commercially related to the object. A description of the additional information or object may also be defined. The description provides the user of the media content with written information related to the additional information once the user selects the object. For example, the description may be a brief message explaining the object or a promotion related to the object. An image, logo, or icon related to the additional information may be defined. The user viewing the media content may be presented with the image related to the additional information once the object is selected by the user.

The object time metadata may be a particular point in time or duration of time. For example, the authoring tool 110 may record a start time and an end time that the shape is drawn in relation to the object. The object time data may also include a plurality of different points in time or a plurality of different durations of time. The shape of the interactive element 101, time, and other metadata is saved in the portable package for later interactivity as will be discussed below.

Figure 11:
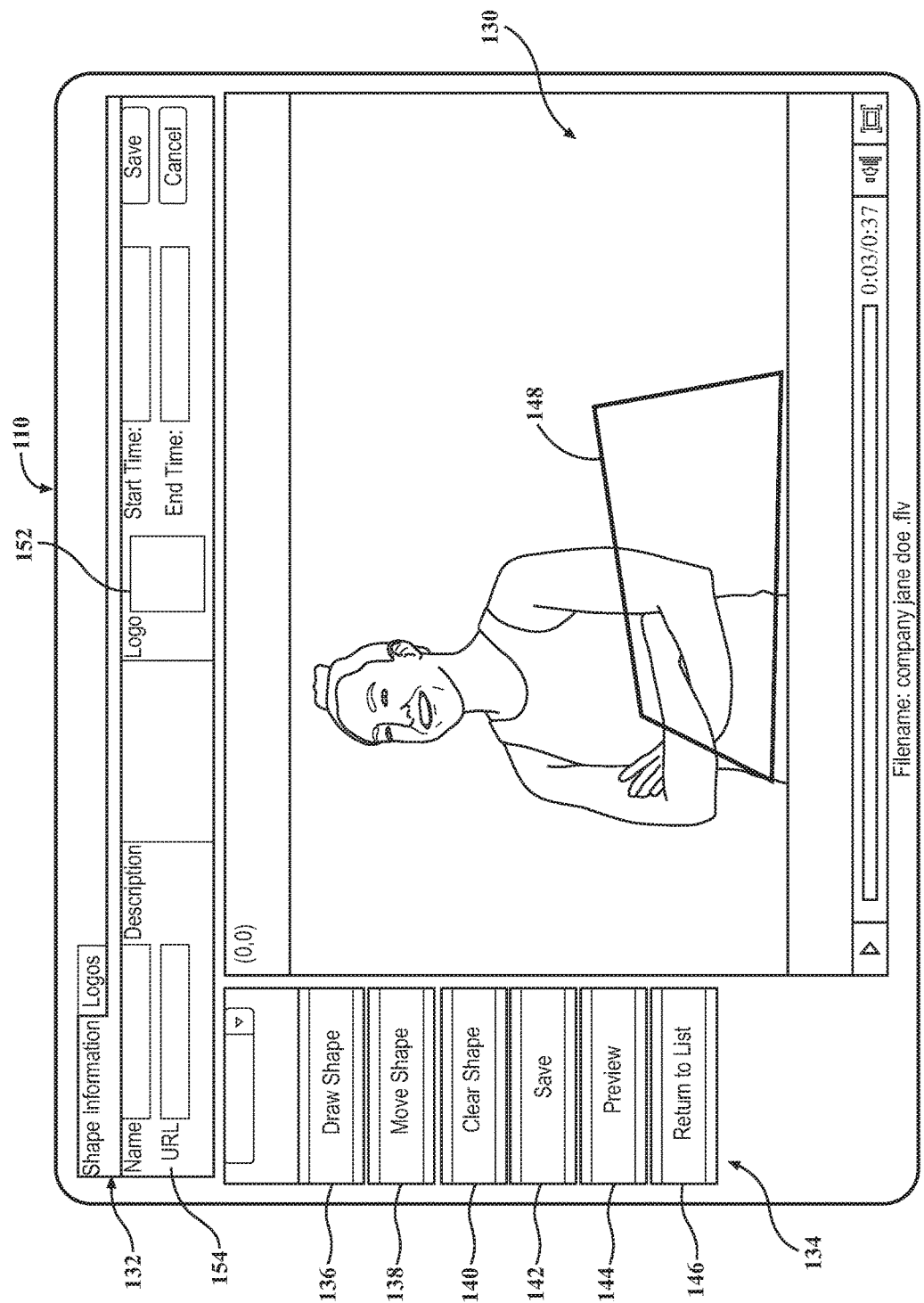
Figure 12:
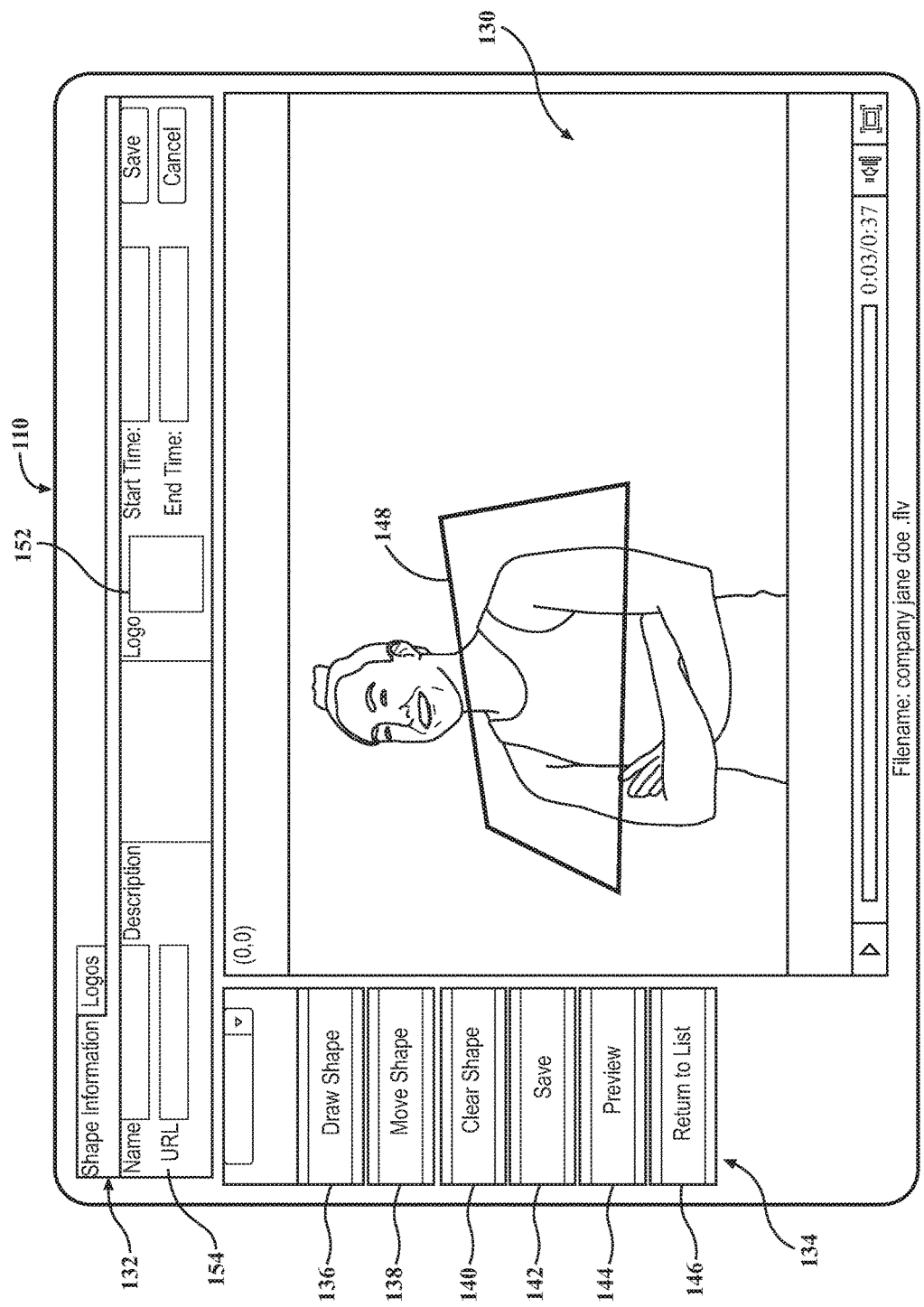
Figure 13:
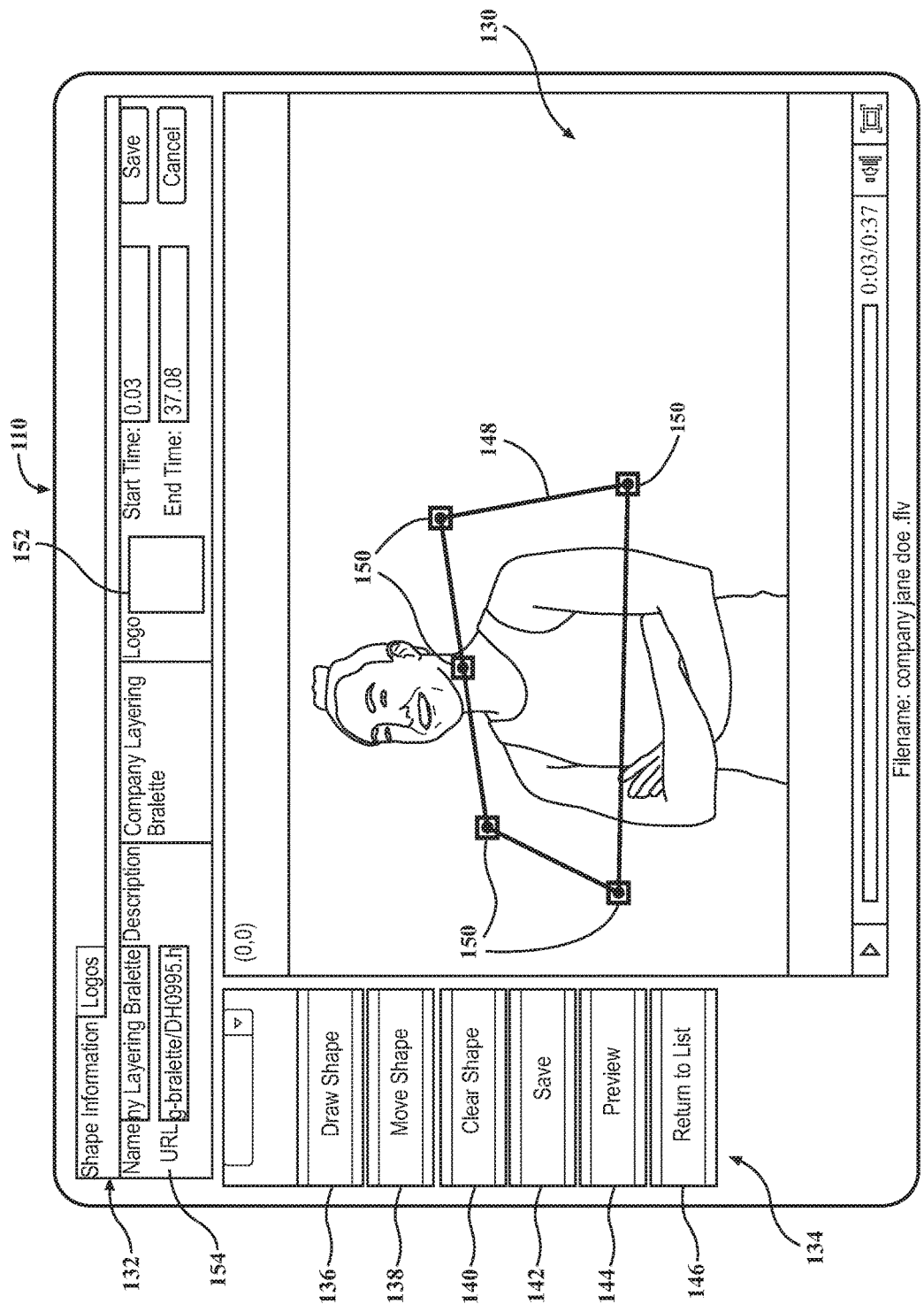
Figure 14:
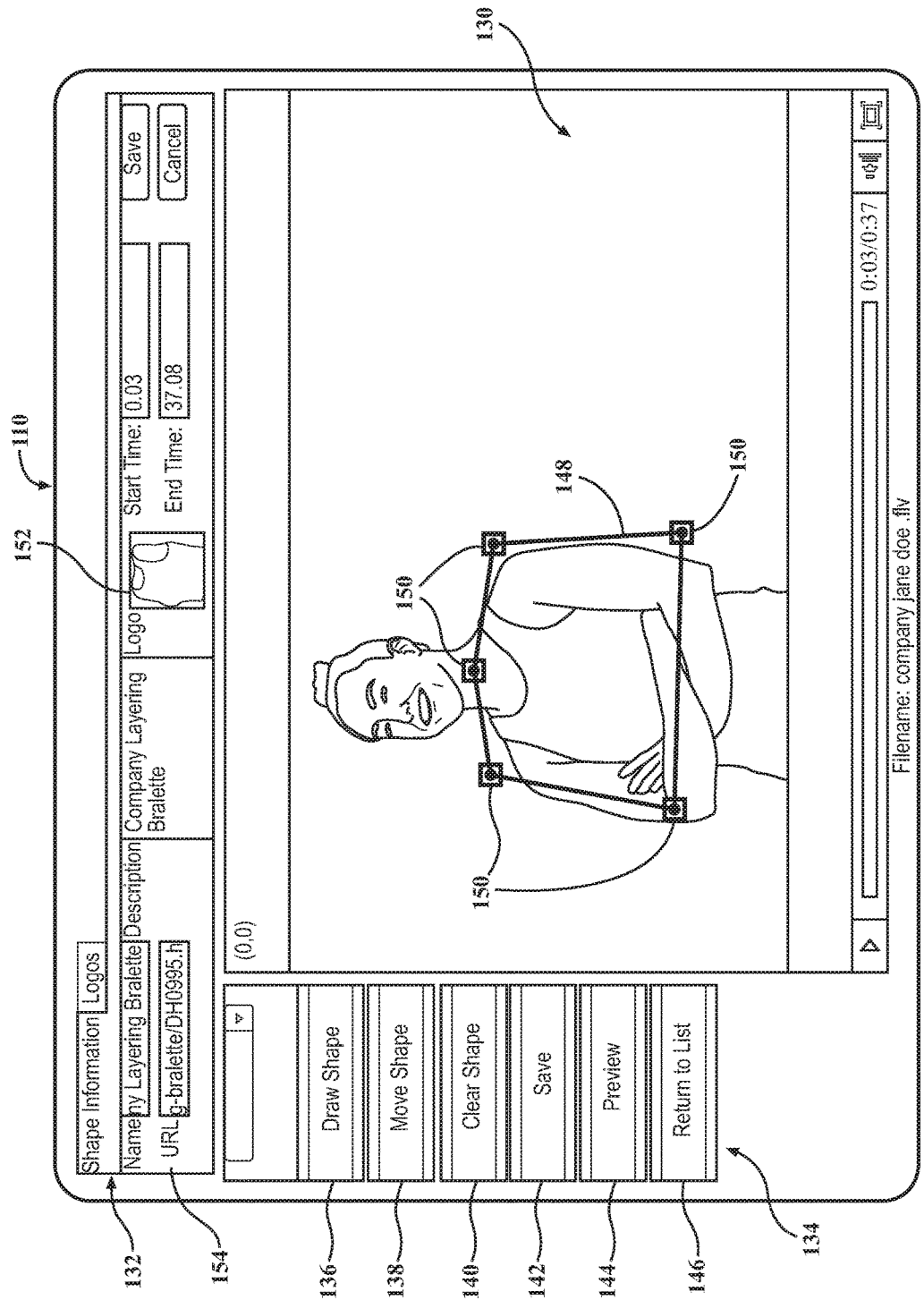

For each of the desired objects in the video, at the designated video playback time, this creation process is repeated. In other words, the media content is then advanced forward, i.e. played or fast-forwarded. In such instances, the element parameters may be re-established in response to changes to the object in the media content. The shape 148 may be re-defined to accommodate a different size or position of the object. Once the shape 148 is re-defined, updated element parameters may be established. Referring to FIG. 11, the media content has been advanced such that a field of view has changed and this may require re-defining the interactive element 101, such as repositioning, enlarging or reducing the interactive element 101 for the object in response to the size of the object becoming larger or smaller within the media content. The closed spline shape 148 may be re-defined, as shown in FIG. 12, as the object changes location and size throughout the media content and the shape information is continuously updated. It is to be appreciated that the interactive element 101, while in the authoring tool 110 is not "interactive" in the same sense when accessed from the user device. Referring to the authoring tool 110, the terms element 101 and the shape 148 can be used interchangeably. In FIG. 13, the interactive element 101 is redefined by selecting the draw shape command 136 and by clicking and dragging the closed spline to fit the size and location of the object. In FIG. 14, the interactive elements 101 have been reduced to correspond with the size of the objects. As the interactive element 101 is re-defined, element parameters are continuously updated.

Figure 15:
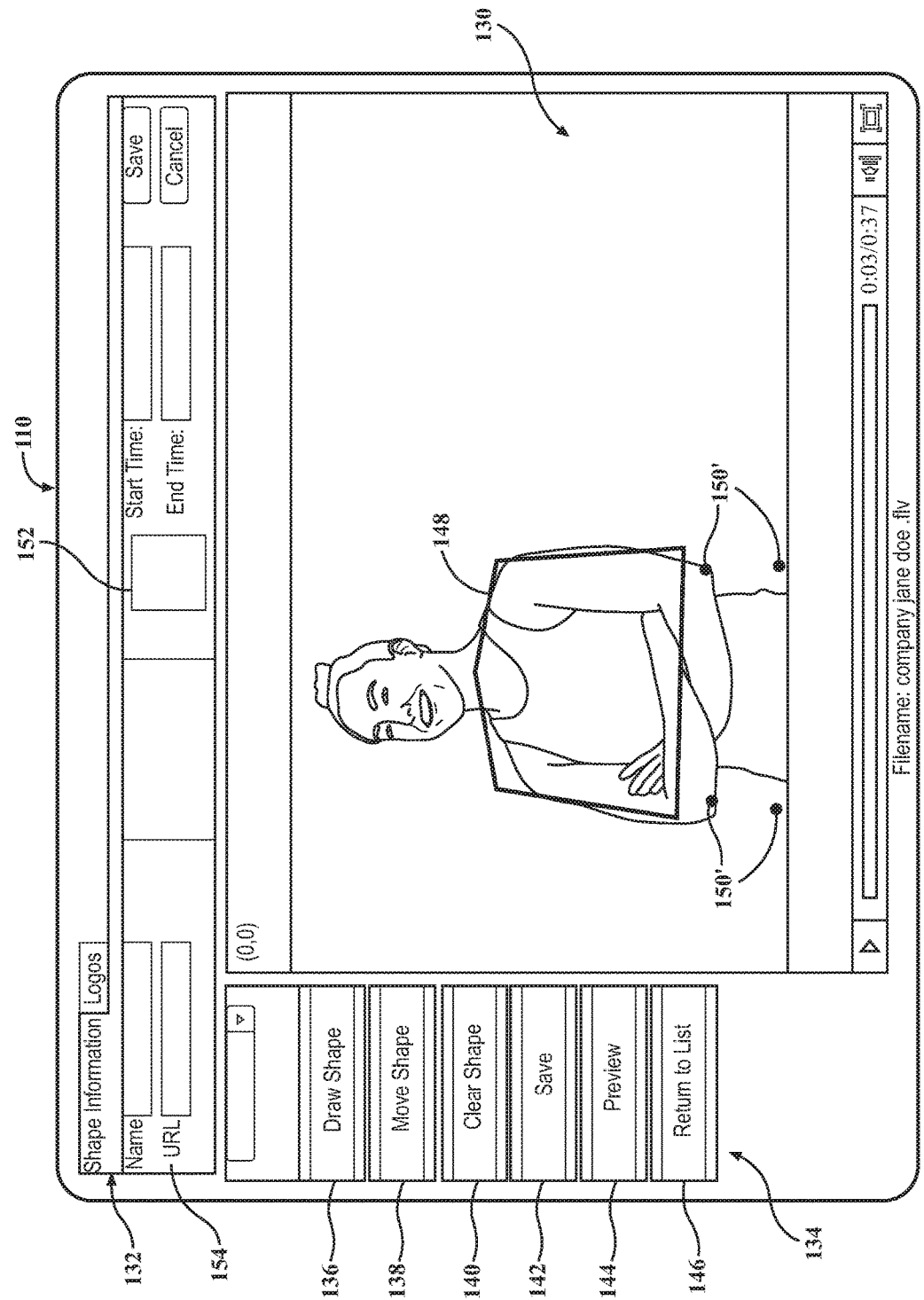
Figure 16:
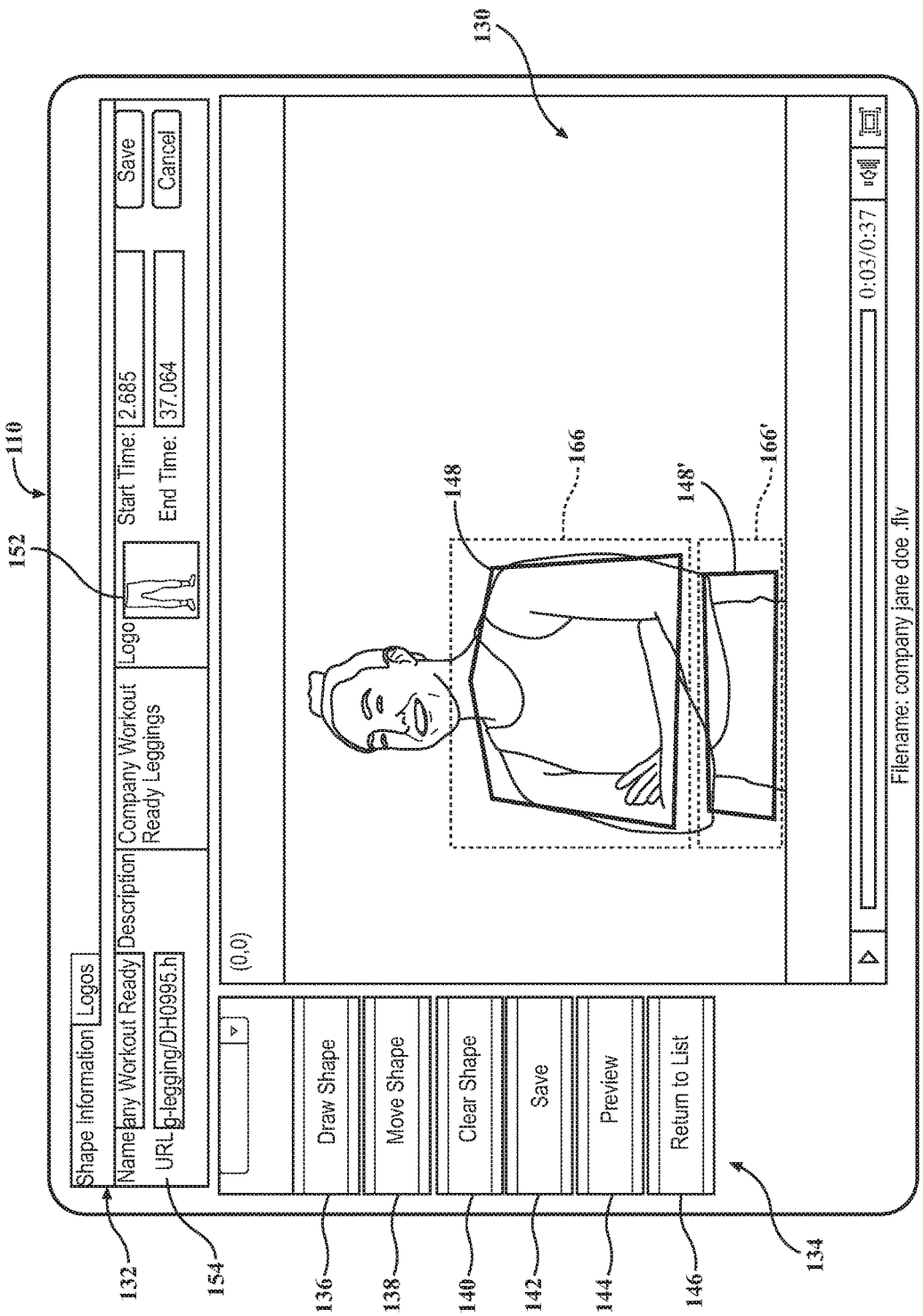
Figure 17:
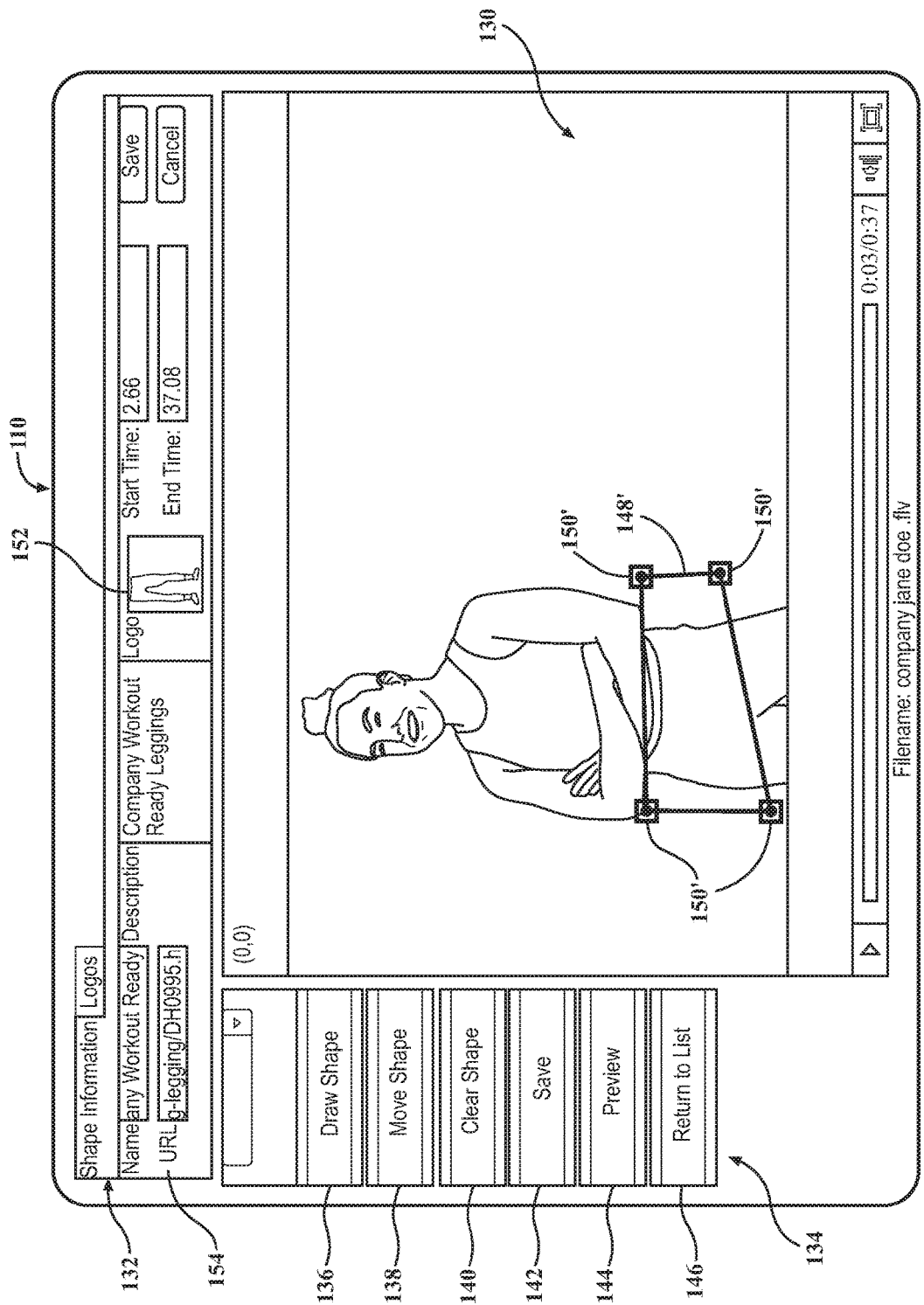
Figure 18:
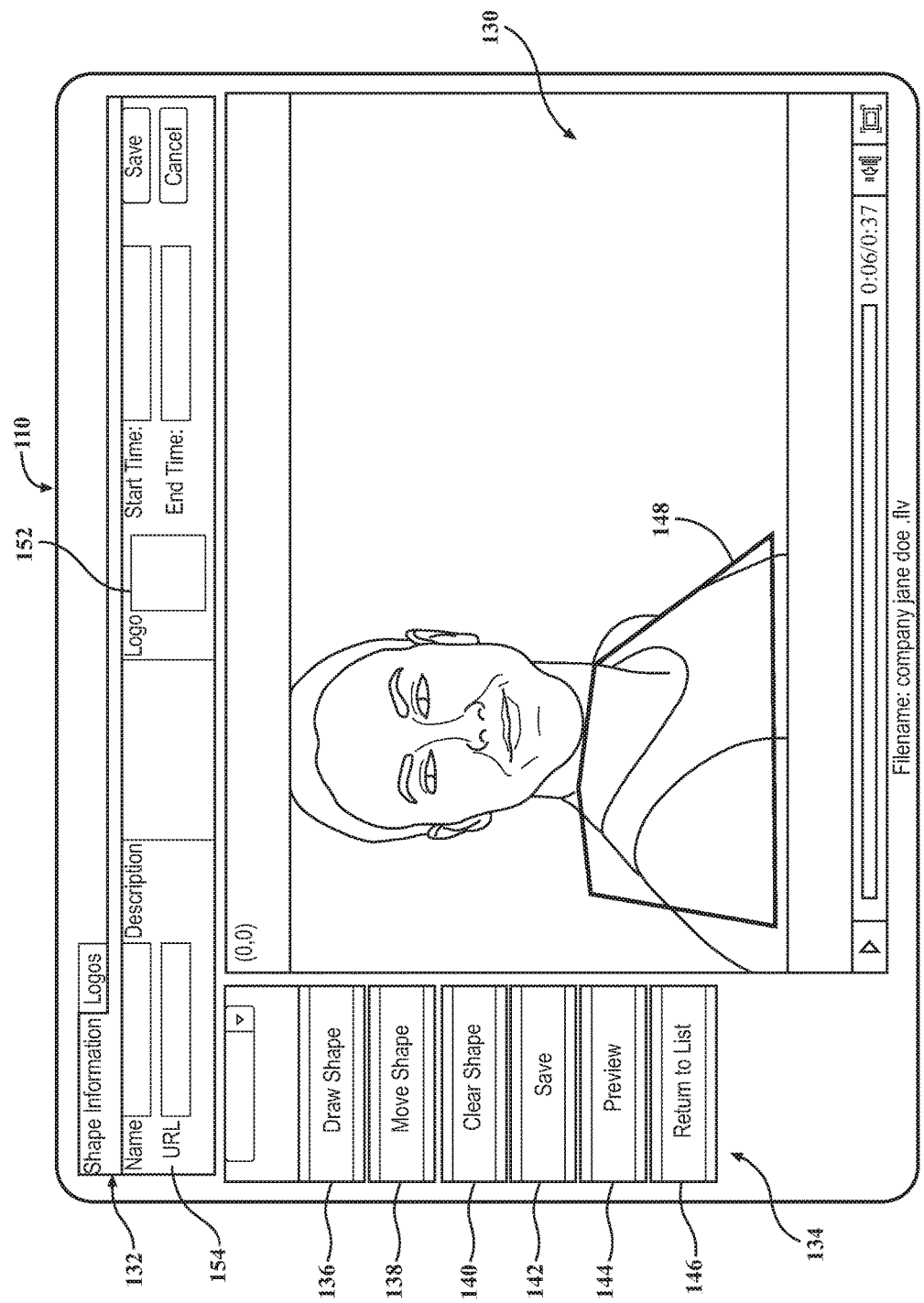

Referring to FIG. 15, a second object has appeared in the video and is defined similarly by selecting the draw object command 148 and creating vertices, shown as 150'. The shape is closed as a shape 148' and the metadata is entered as shown in FIG. 16. Referring to FIG. 17, the field of view has again changed and the second object has been modified. Once the interactive elements 101 have been created, if the object is removed from the video sequence, the interactive element 101 can be cleared, removed from the editing panel 130, or deactivated. In FIG. 18, the field of view has again changed and only the first object is now present.

Once the ending point of the media content is reached, the object has been tracked and the shape data for the interactive element 101 has been defined for the length of the media content. The element parameters may then be stored. If there are multiple objects in the media content, then a plurality of interactive elements 101 may correspond to each of the plurality of objects and each of the plurality of interactive elements 101 would have corresponding element parameters.

In order to create the interactive elements, a (0,0) origin is established whereby the authoring tool 110 can measure each (X, Y) point (vertex) and the relative distance from the origin. As one example, the origin may be located in the upper left hand corner of the authoring tool 110. However, it is to be appreciated that the origin may be any consistent location. The consistent starting origin and the (X, Y) coordinate information for points are used to scale shape coordinates and to adapt to different display conditions specified by the customer viewer 102.

In order to ensure interactivity when the portable package is deployed, the coordinate information has to be consistent for different types of and differently sized media content, which will depend on the user device. The media content is loaded into the authoring tool 110 at a default resolution for creating the interactive elements 101 regardless of the native video resolution. This creates a 1:1 correspondence for a coordinate grid between the authoring tool 110 and the media contact. By way of example, the authoring tool 110 has a default resolution, such as 640×480, which is an aspect ratio of 4:3. The video file has a native video resolution, such as 720×405, which is an aspect ratio of 16:9. The video is converted to display at the default resolution of the authoring tool 110 such as by inserting bars at the sides or the top and bottom of the video to achieve this 1:1 correspondence for the coordinate grid. Next, the interactive elements 101 are defined based on element parameters, such as location and time for objects present in the video. The element parameters are saved at this 1:1 correspondence for each of the desired objects in the video.

Figure 19:
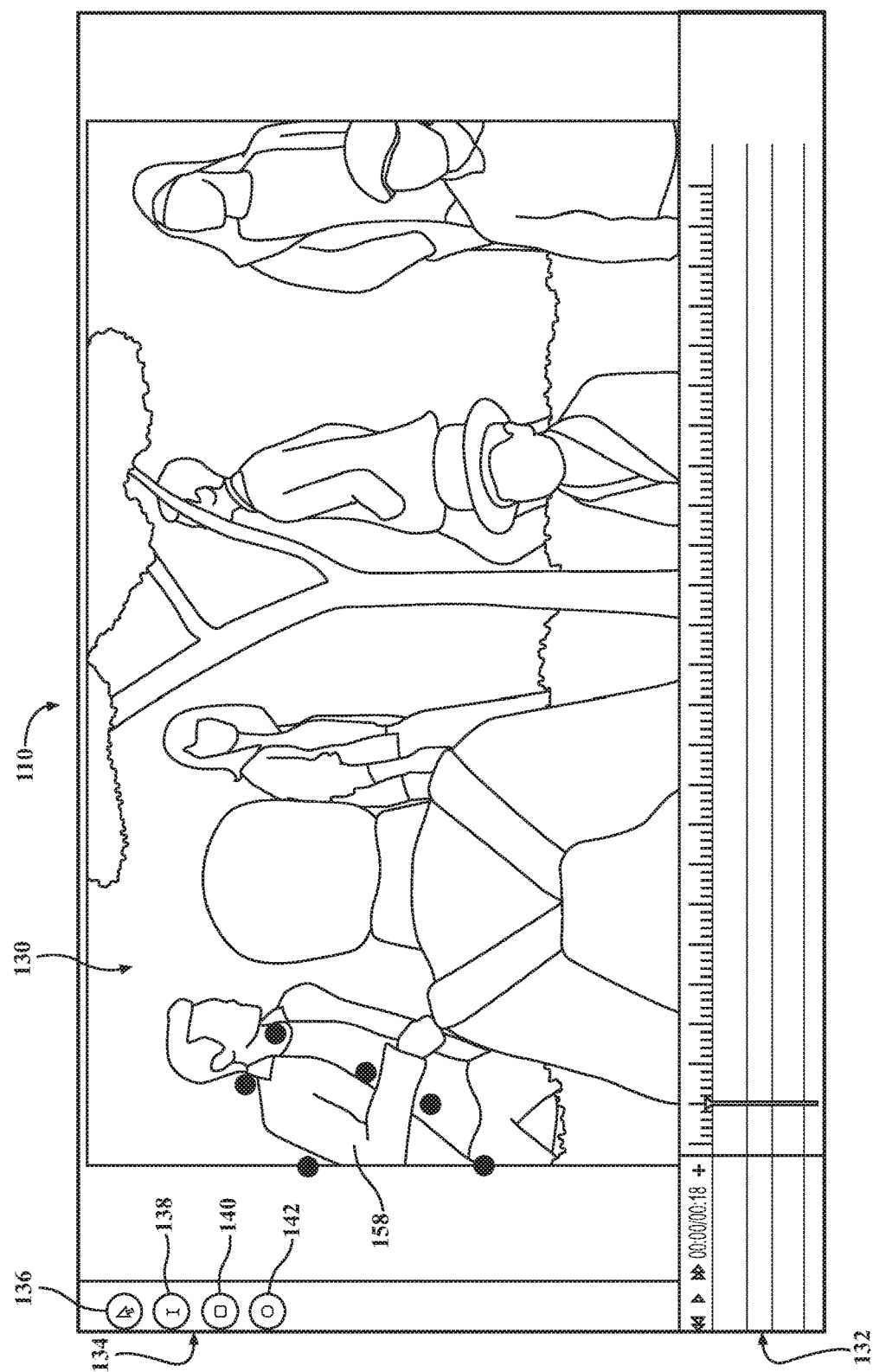
FIGS. 19-26 are illustrations of another embodiment of an authoring tool for creating interactive elements that correspond to objects in the media content.
Figure 20:
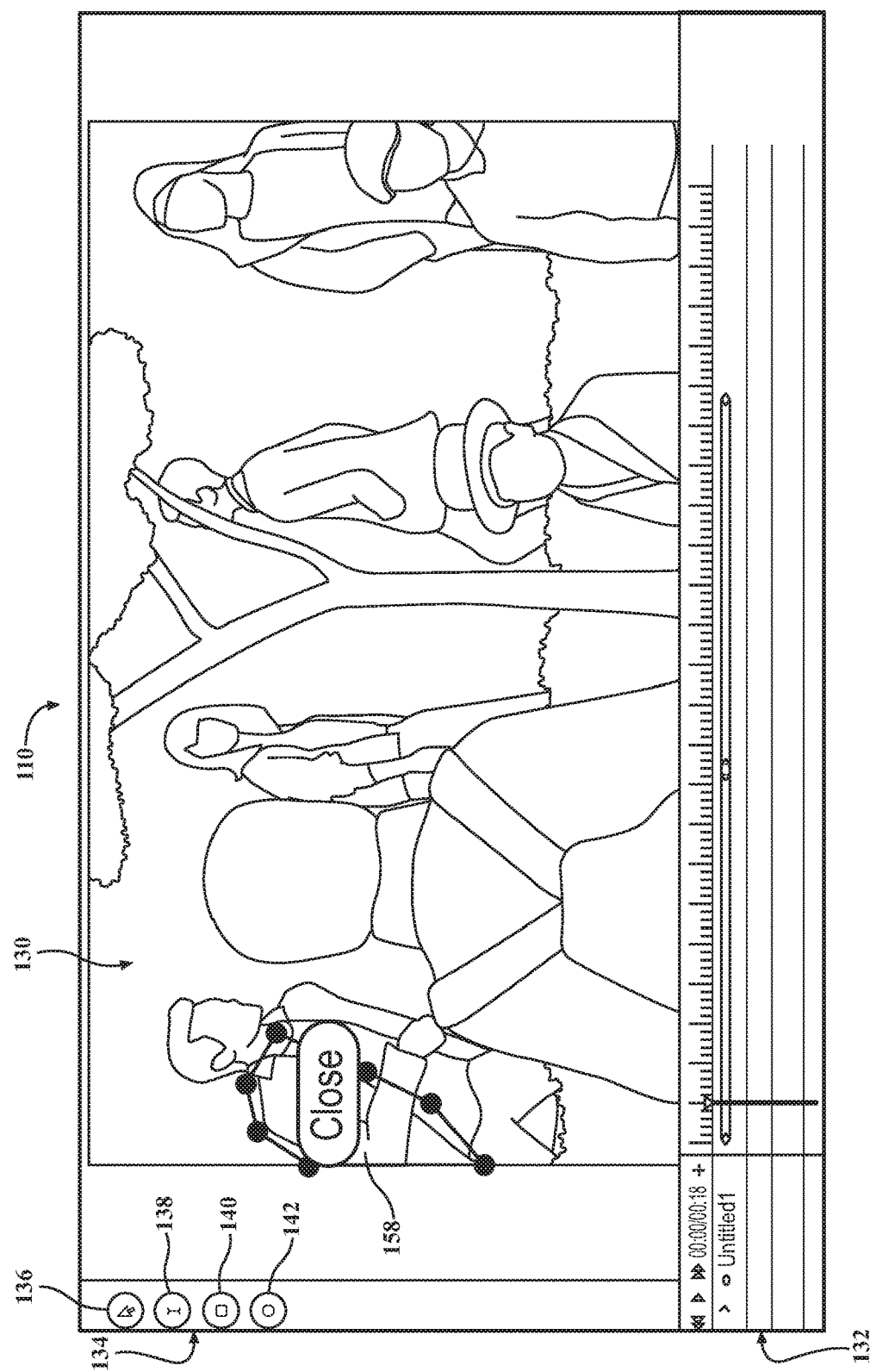
Figure 21:
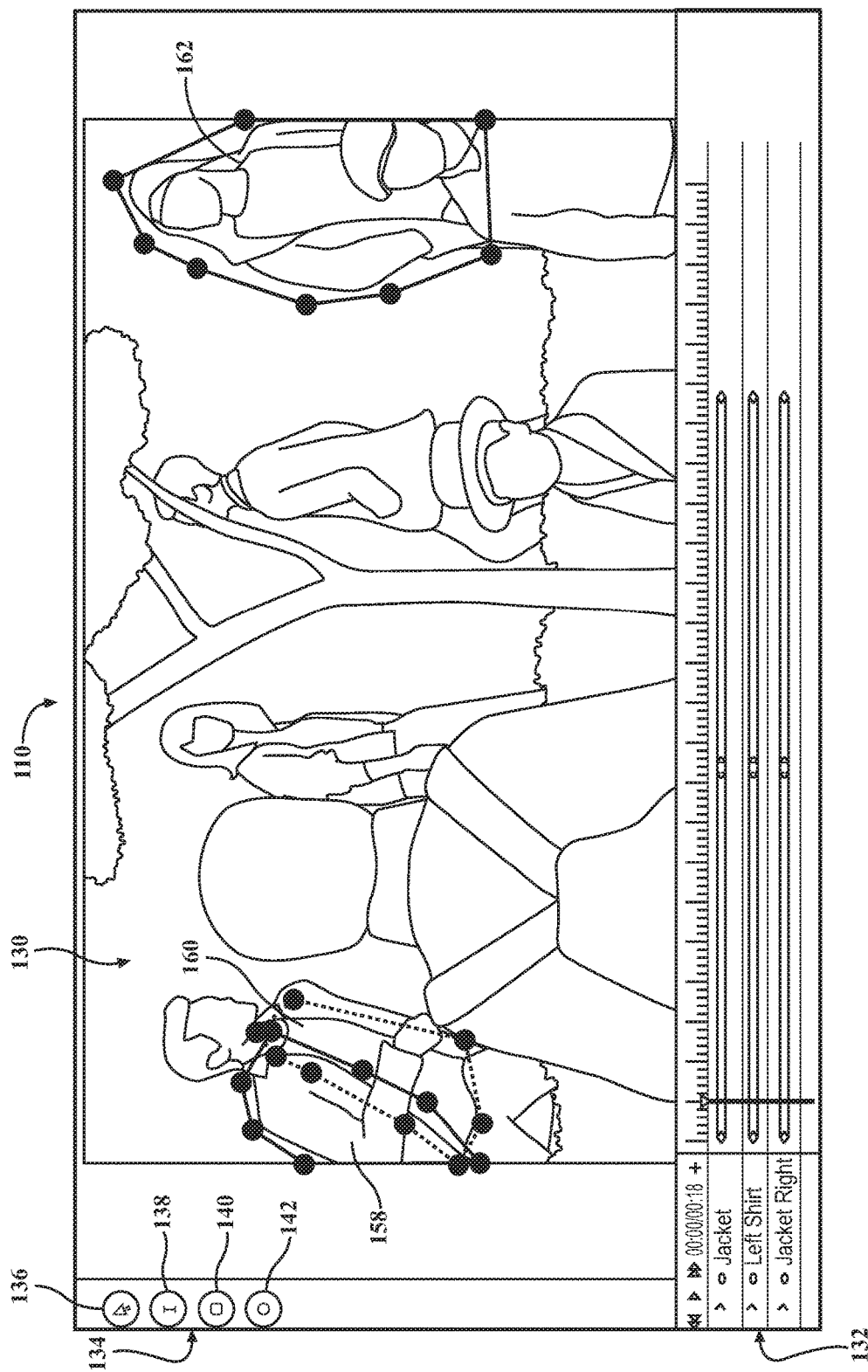
Figure 22:
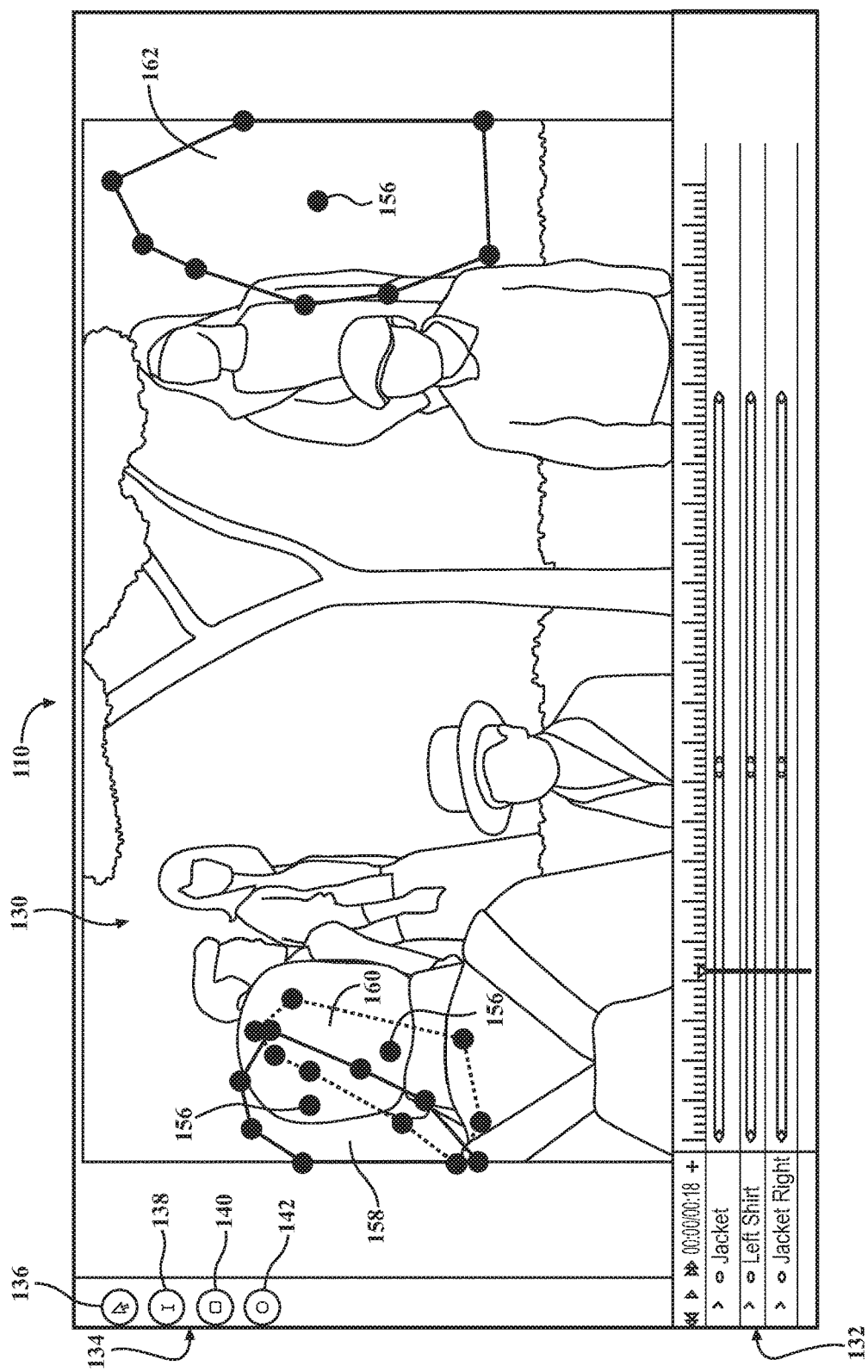

Yet another embodiment of the authoring tool 110 is shown in FIGS. 19-26. In FIG. 19, the author selects vertices to create the interactive element 101 for a jacket 158. The authoring tool 110 closes the shape, as described above, which is shown in FIG. 20. Next, the interactive element 101 is named "jacket" which is shown at the lower left timeline. Two other interactive elements 101 have been created and closed, i.e. "left shirt" 160 and "jacket right" 162 in FIG. 21. As the video sequence progress, in FIG. 22, the objects have moved, but the interactive elements 101 have not yet been redefined. In one alternative embodiment, the interactive element 101 can be modified without the need to select all points by utilizing a selectable center-point 156. The selectable center-point 156 is established after the shape has been defined and is made available for selection. Selection of the center-point 156 allows the author to follow the movement of the desired object and size can be adjusted through keyboard shortcuts and/or through selecting each point and moving its location, as discussed above.

Figure 23:
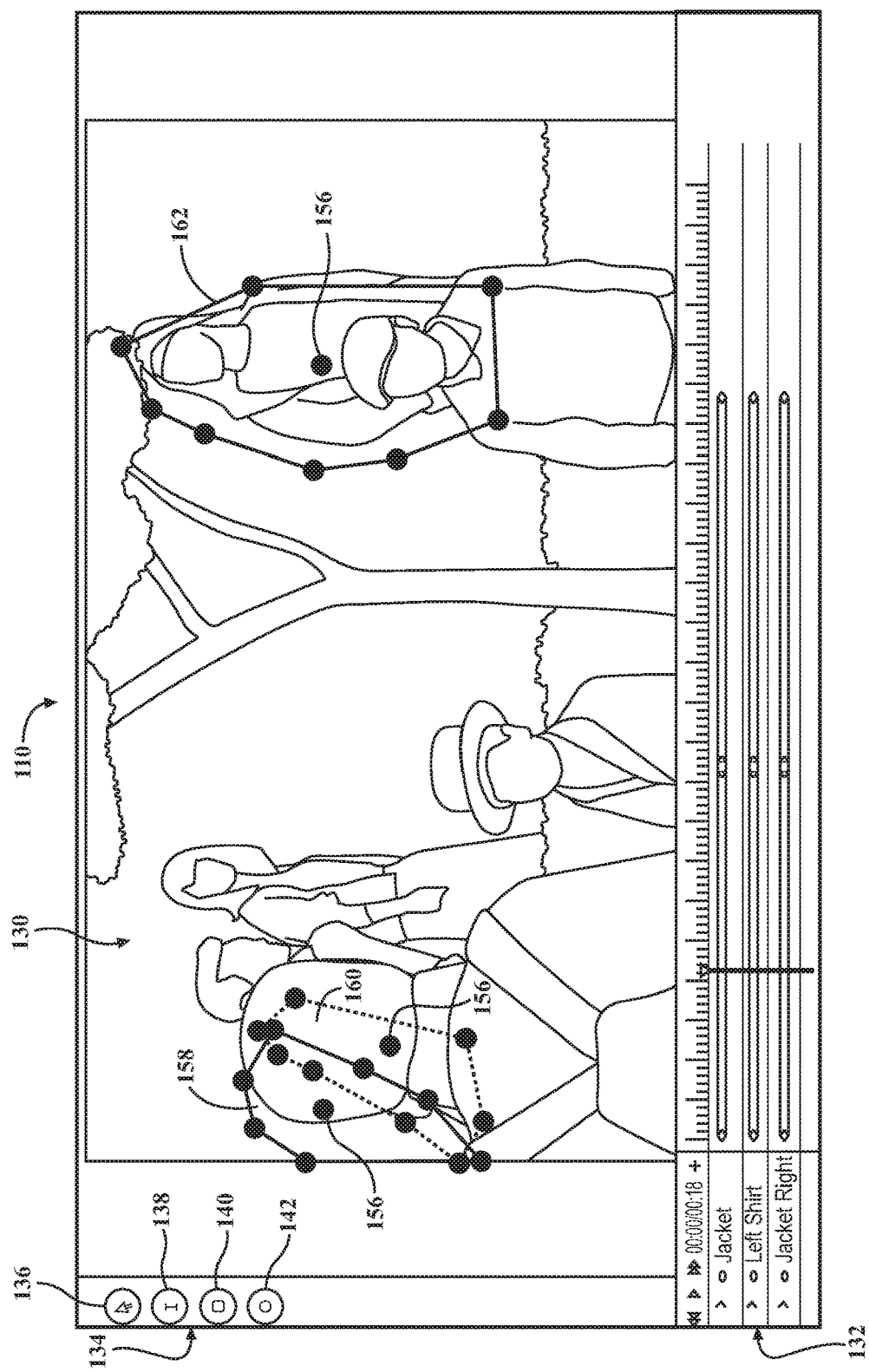
Figure 24:
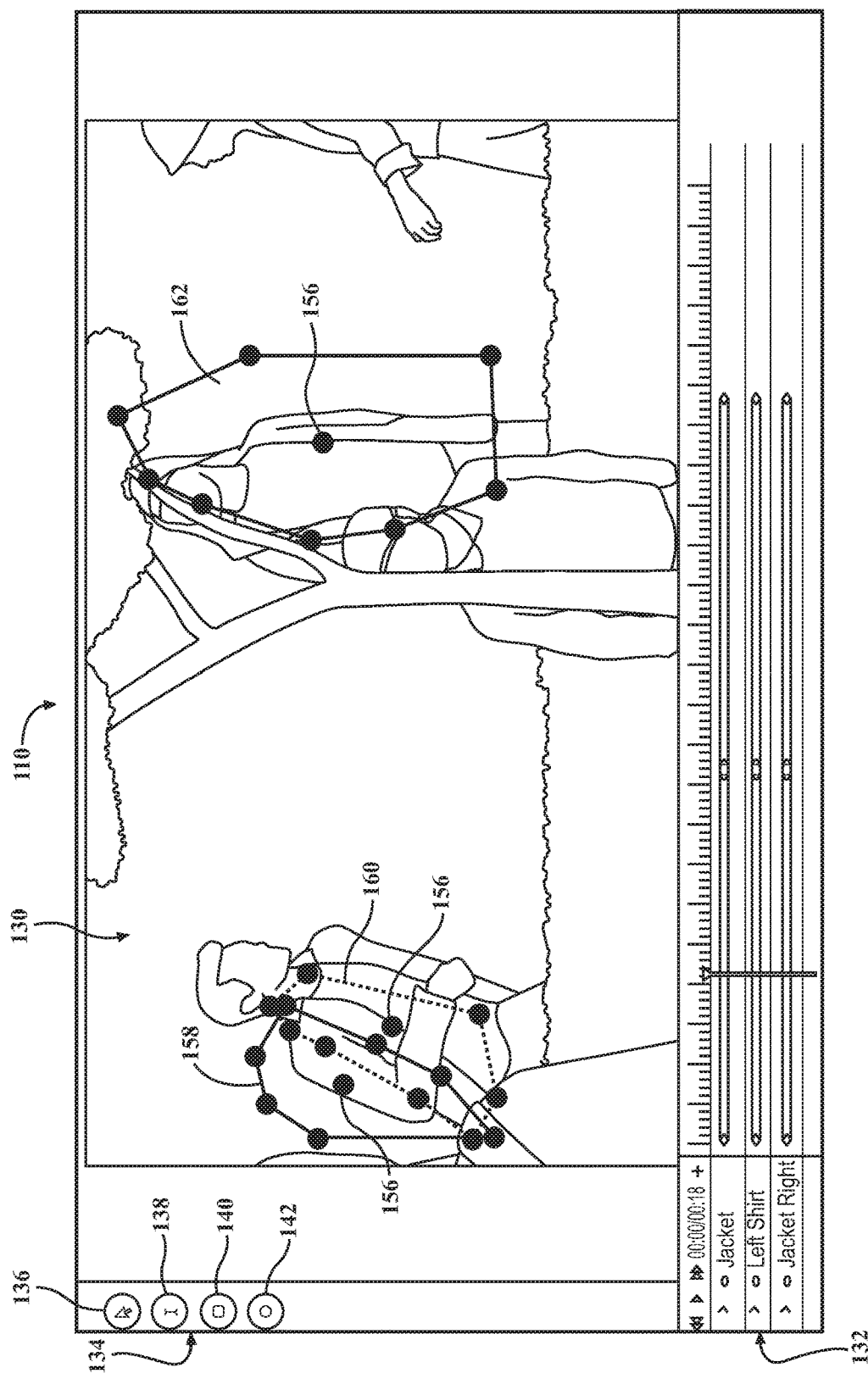
Figure 25:
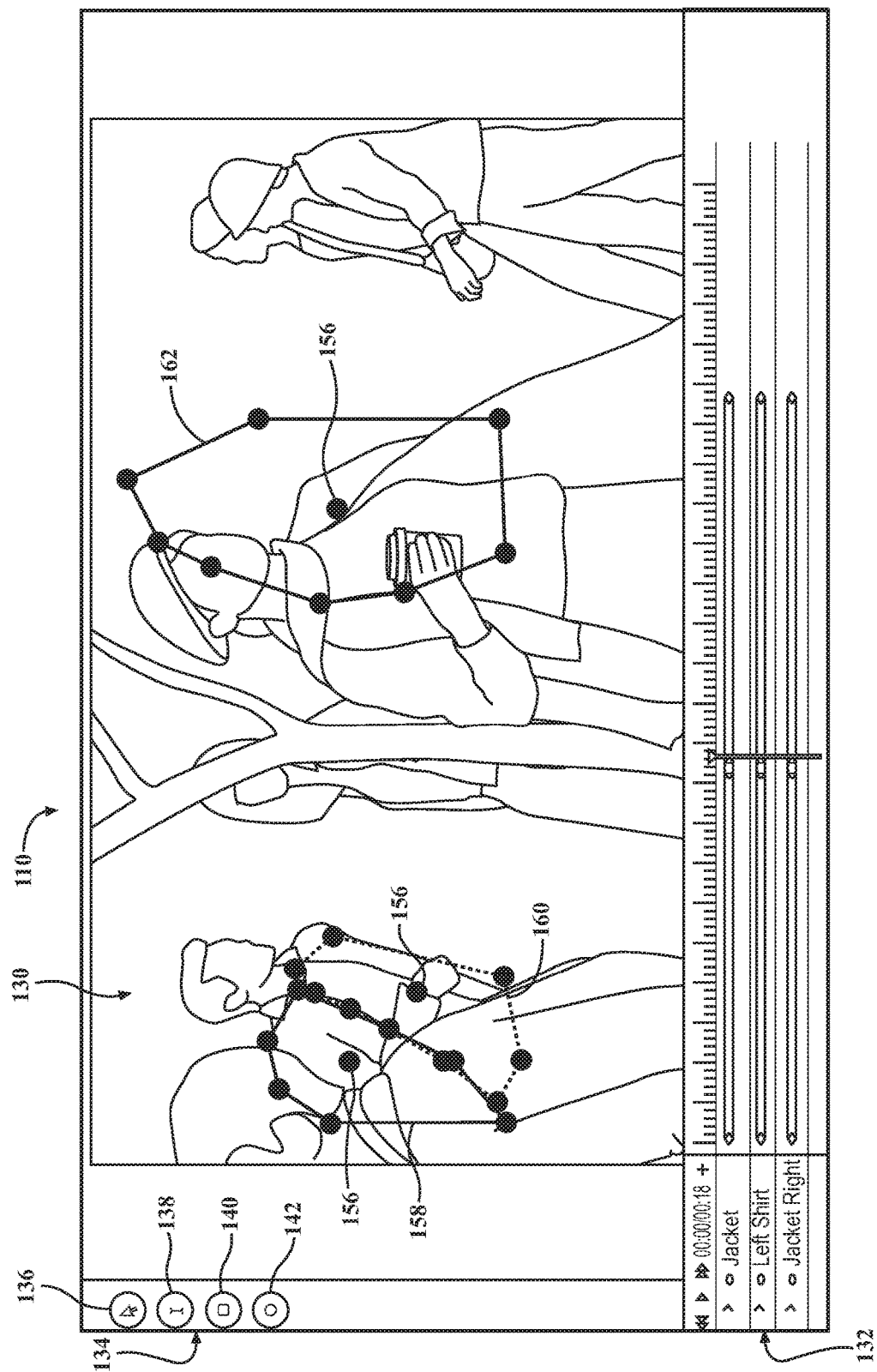
Figure 26:
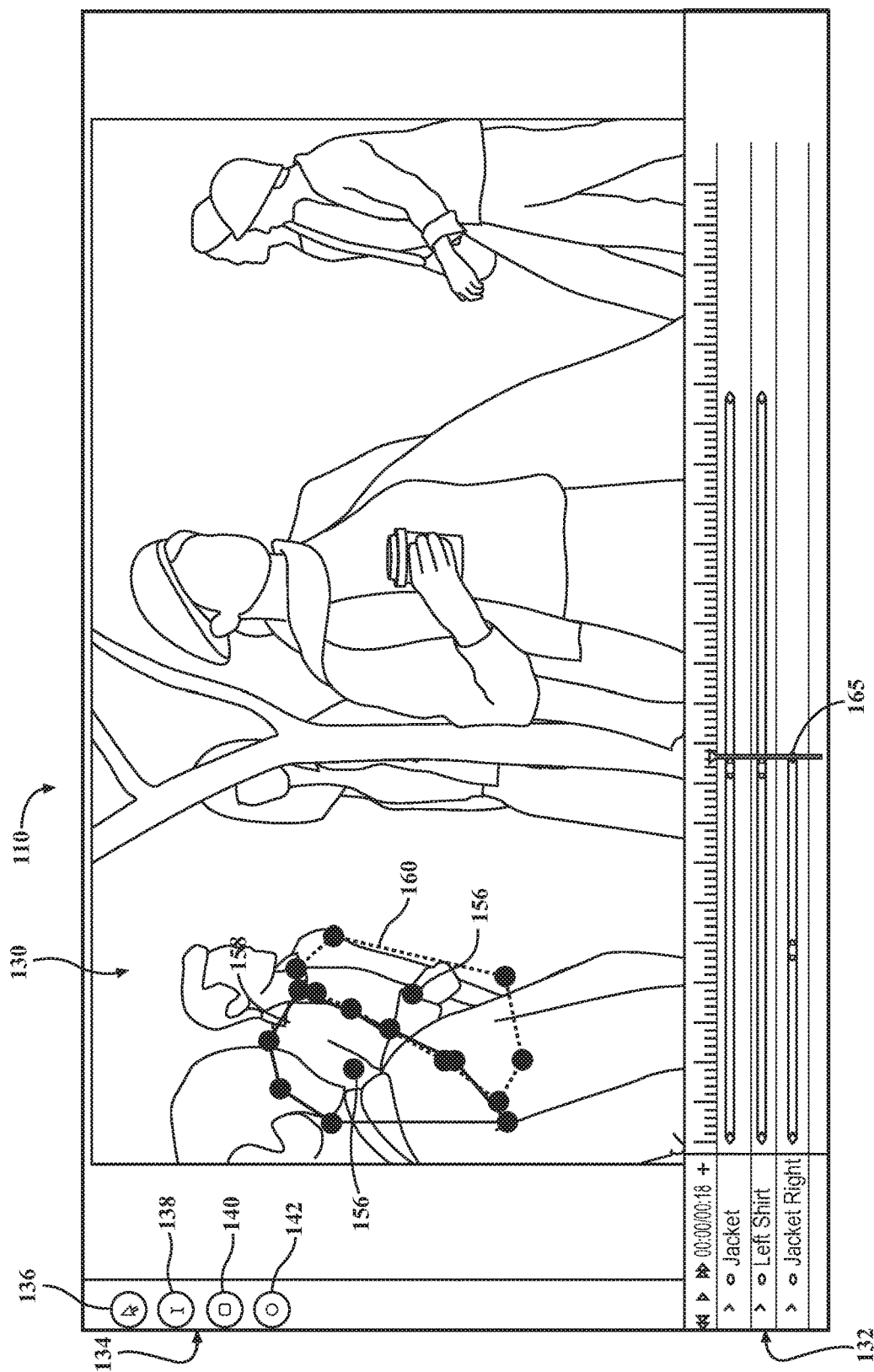
Figure 27:
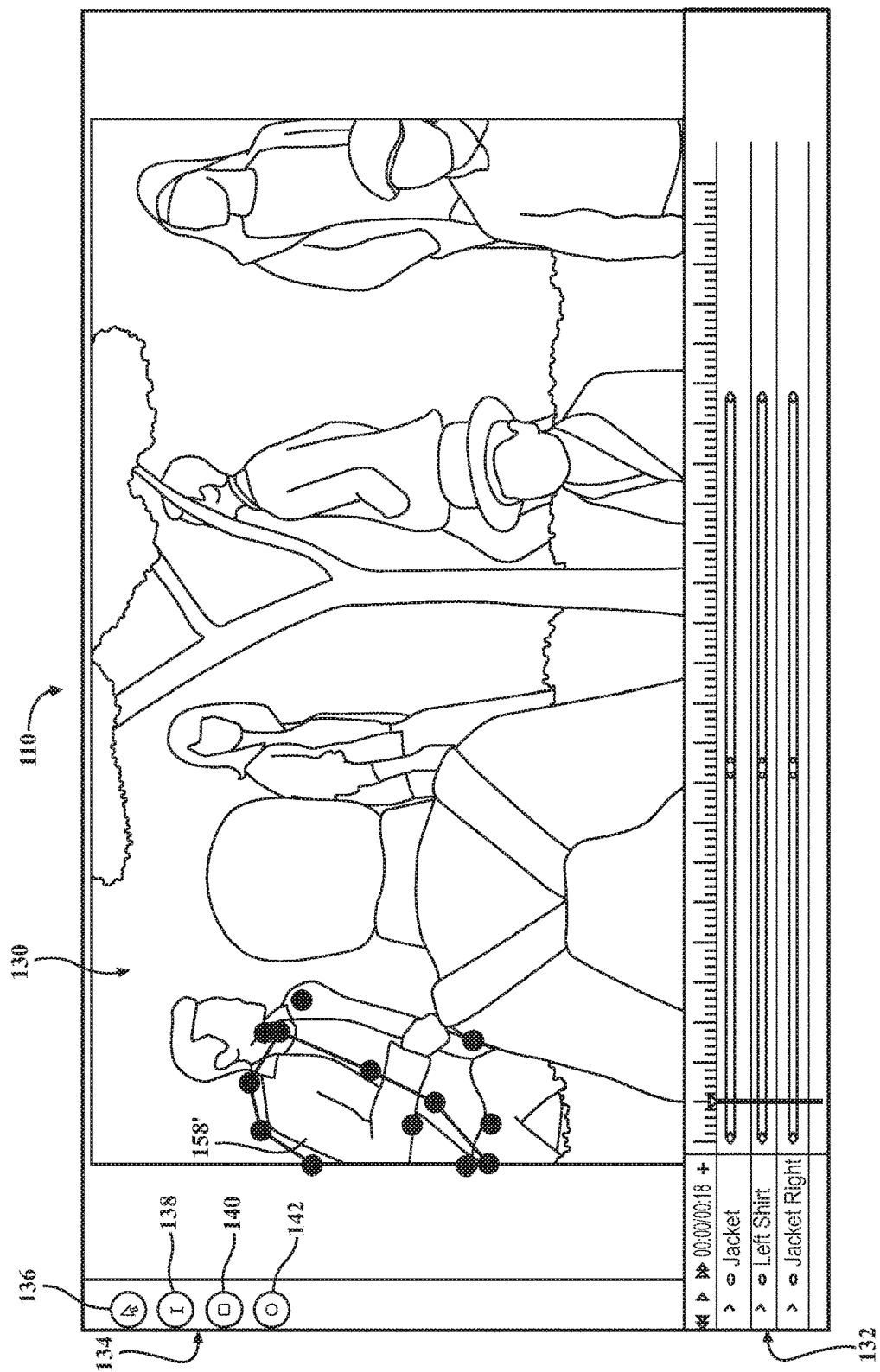
FIGS. 27-32 are illustrations of yet another embodiment of an authoring tool for creating interactive elements that correspond to objects in the media content.
Figure 28:
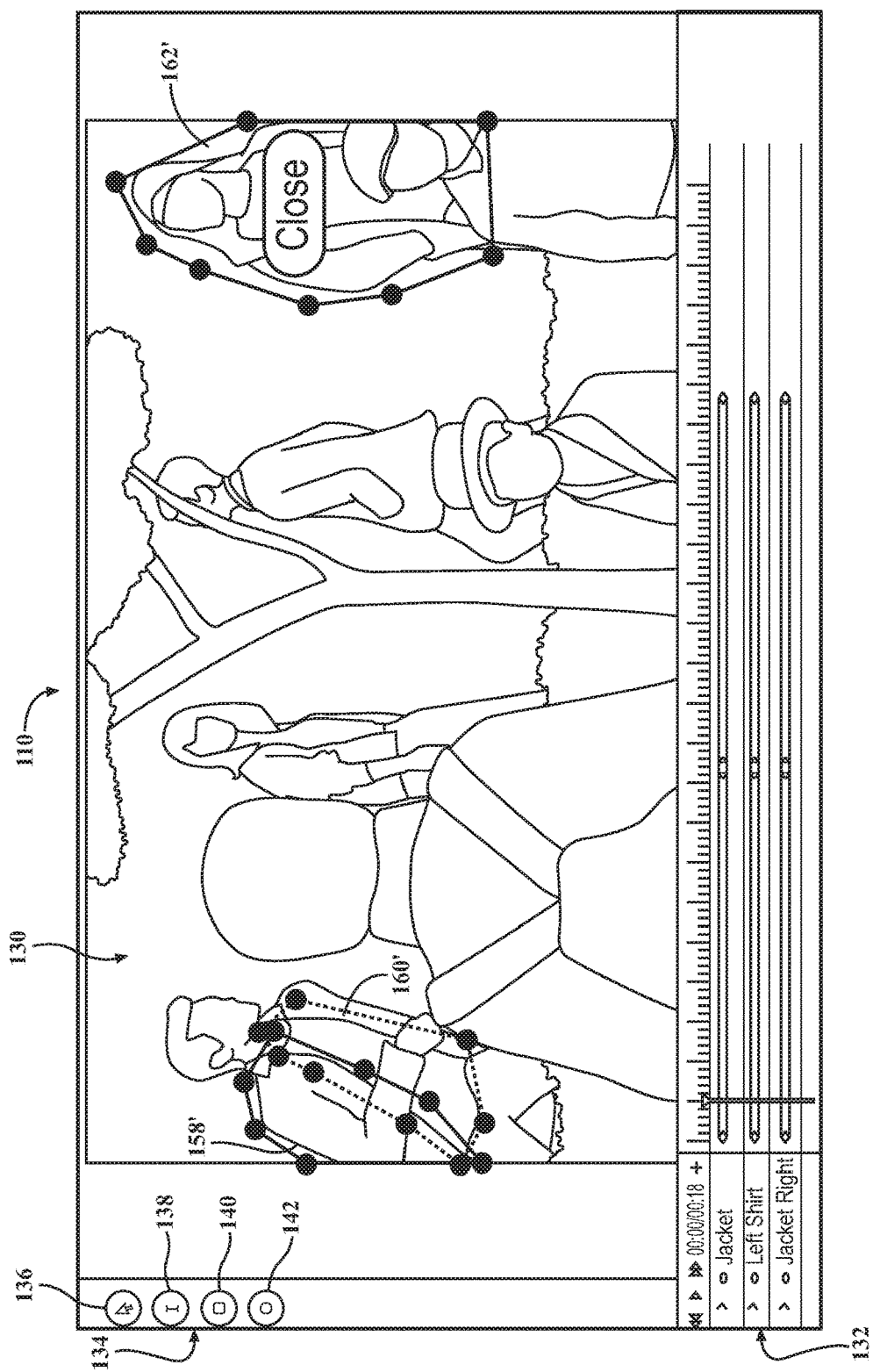
Figure 29:
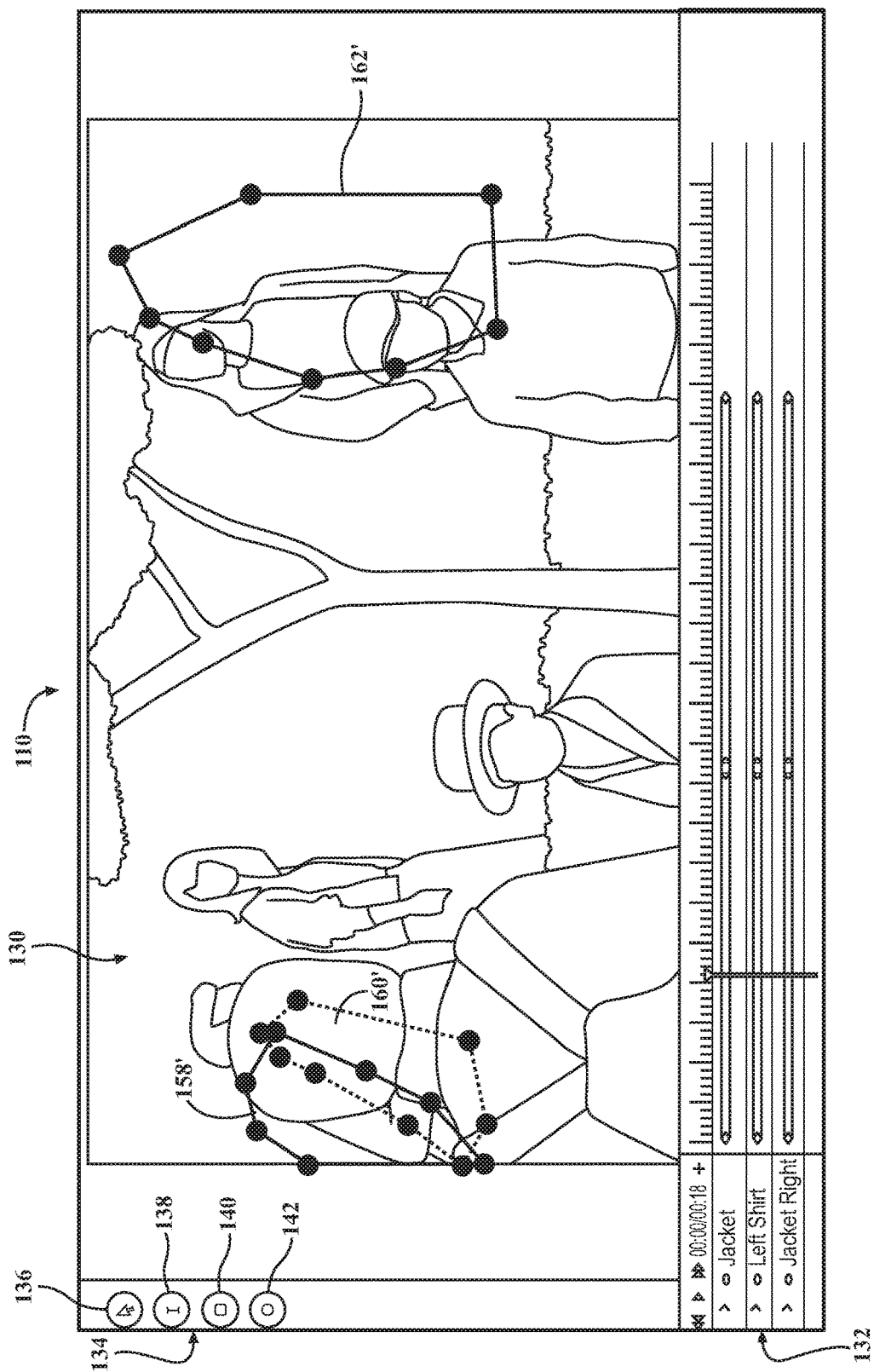
Figure 30:
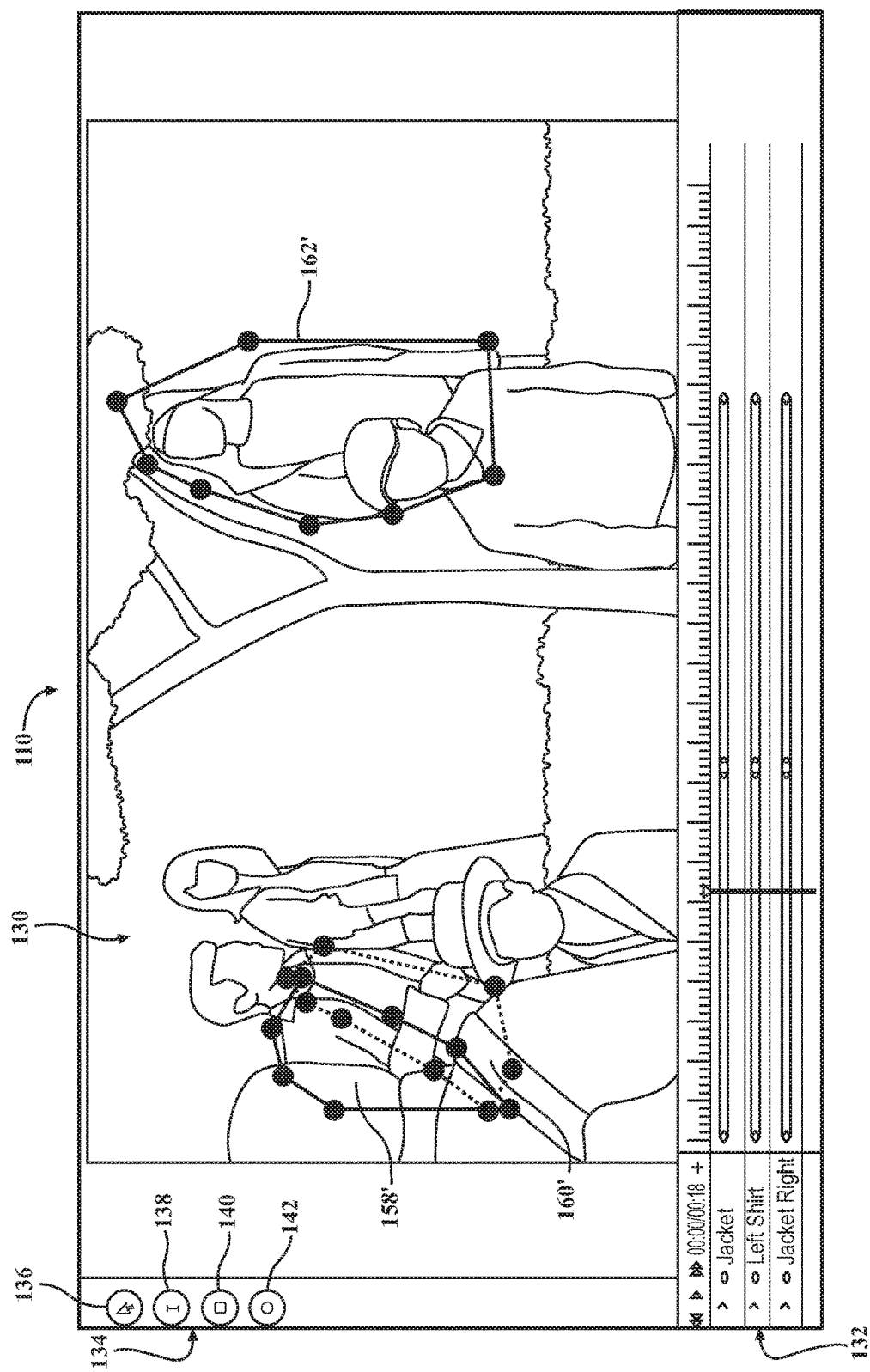
Figure 31:
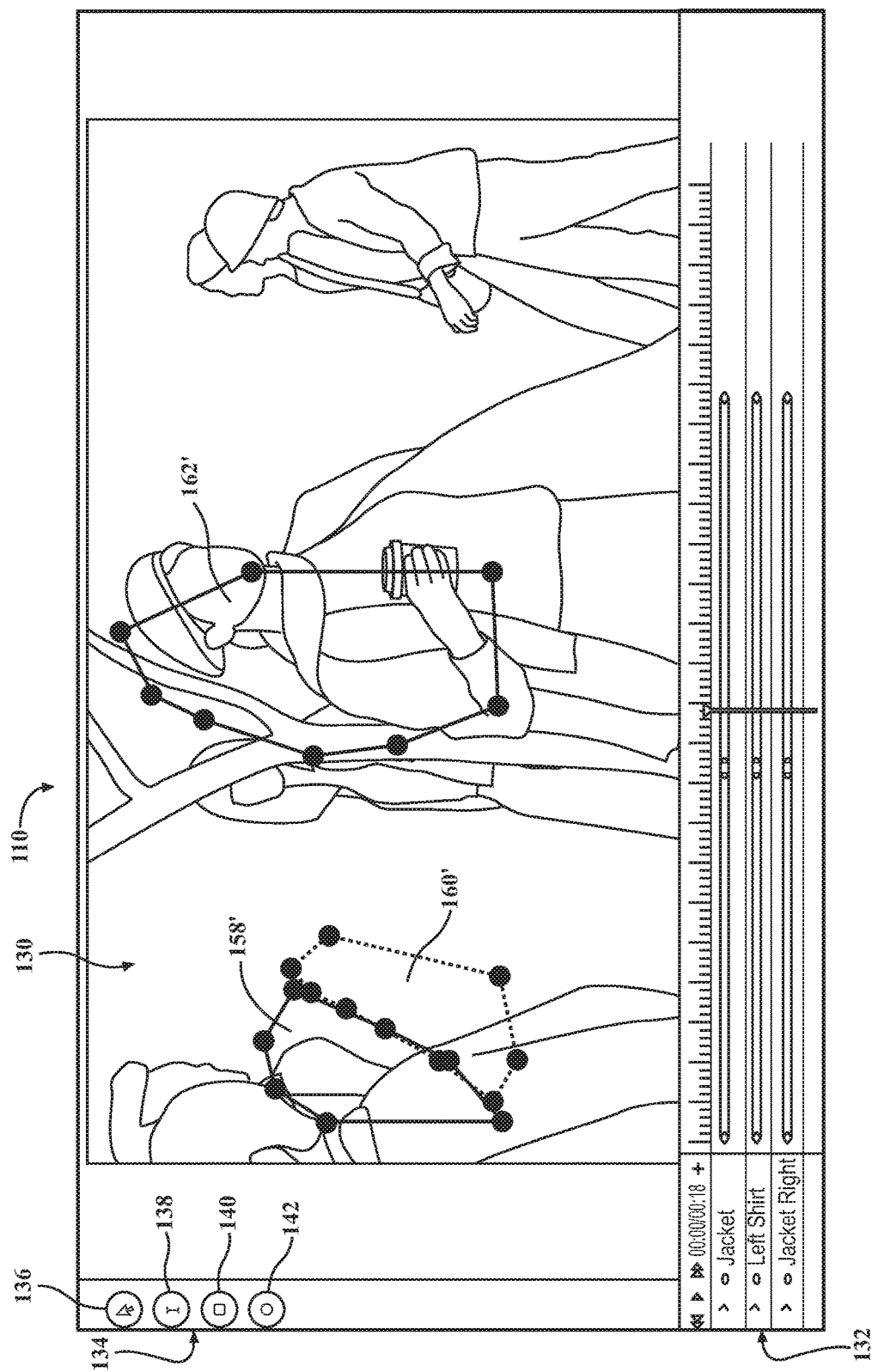
Figure 32:
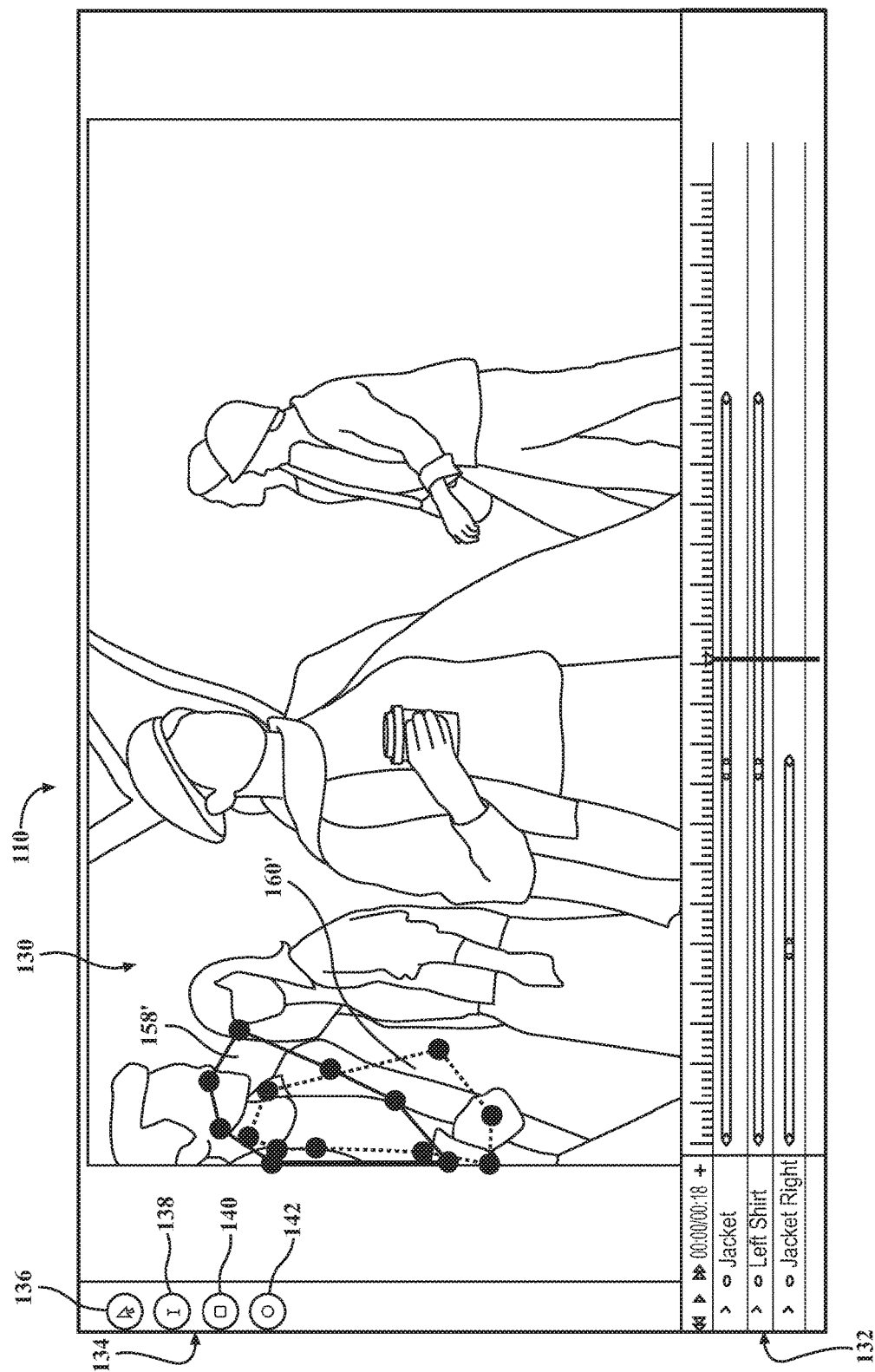

Referring to FIG. 23, the "jacket right" 162 interactive element 101 has been moved to align with the object and, in FIG. 24, the object has moved again. In FIG. 25, the interactive elements 101 for the "jacket" 158 and "left shirt" 160 have been redefined, but the object for "jacket right" 162 has been blocked by other objects in the video sequence. In FIG. 26, the interactive element 101 for "jacket right" 162 has been deactivated as represented by a truncated timeline 165, which would allow it to be reactivated as needed. For each shape, the center point 156 is defined and the distance and angle from each pick point is recorded. The center point 156 is made available through the display in the authoring tool 110 in order to assist with manual movement of shapes.

FIGS. 27-32 show another embodiment of the authoring tool 110 that utilizes automatic tracking of the interactive elements 101. The interactive elements 101 are defined by the author as described above having the interactive elements 101 "jacket" 158', "left shirt" 160', and "jacket right" 162'. Instead of the author manually redefining the interactive elements 101, when the video sequence advances, the authoring tool 110 monitors the objects to discover the shapes 148, which is referred to as shape discovery. Shape discovery may be based on color variances and comparison with known object parameters, as described further below.

Figure 33:
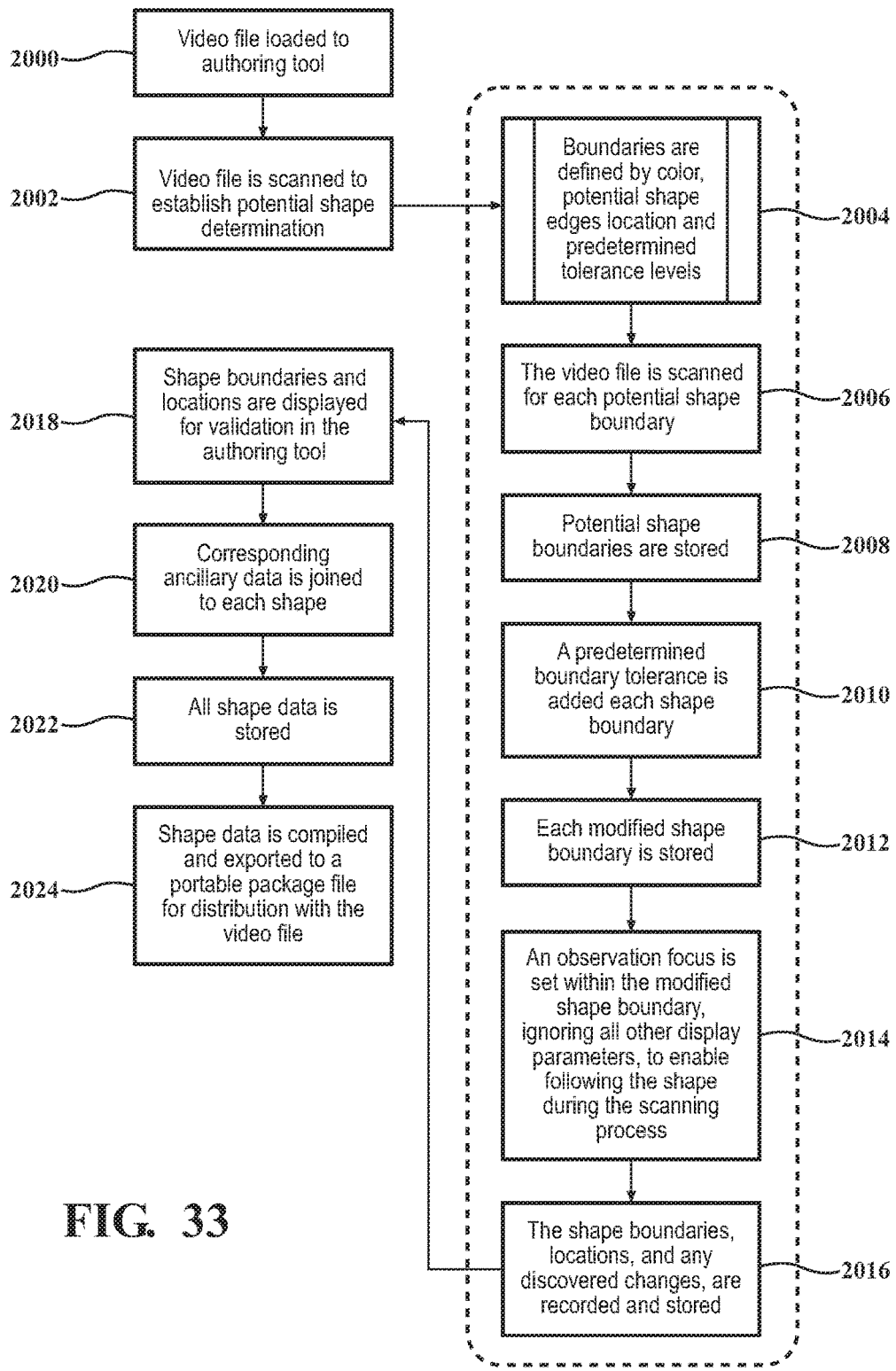
FIG. 33 is a flow chart of one embodiment for using the authoring tool for shape discovery.

FIG. 33 illustrates one process that the authoring tool 110 may use for shape discovery. In Step 2000, the video file is loaded into the authoring and in Step 2002, the video file is scanned to establish potential object shapes. Shape boundaries may be defined by color, potential shape edge location, and tolerance levels, as in Step 2004. Referring back to FIG. 16, one example of a shape tolerance is shown as 166, 166'. The shape tolerance 166 is monitored for the shape 148 and the shape tolerance 166' is monitored for the shape 148'. It is to be appreciated that the shape tolerance is generally not visible and is set by the author in the authoring tool. The shape tolerance can be a dynamic shape tolerance in that it changes based on the incoming native resolution of the media content and the intended output or playback resolution, if known.

Next, in Step 2006, each potential shape boundary 148 is identified, and is stored in Step 2008. As discussed above, the surrounding pick points are connected together as a single spline, each point is a joining location, creating a shape that surrounds the discovered object. The shape tolerance is added to each shape boundary 148 in Step 2010. The shape tolerance may be represented by a percentage increase of the shape area, a number of pixels or by millimeters, or other known measurement. For example, the shape tolerance could be a 10% or more increase of the shape area. Another example is the shape tolerance is a 15% or more increase of the shape area. Alternatively, the shape tolerance may be from 5-30 pixels. Another embodiment has the tolerance of 10-20 pixels and yet another tolerance is 15 pixels. A modified shape boundary is stored in Step 2012. The modified shape boundary is the shape boundary and the shape tolerance.

The method further includes the step of setting an observation focus, or area, within the modified shape boundary and ignoring the remaining field of view in Step 2014. This creates the observation area for determination of movement of the shape throughout the video sequence and allows the authoring tool 110 to follow the shape during the scanning process. In other words, the authoring tool 110 does not monitor the entire field of view for each object, instead it monitors only the object and its modified shape boundary. Once the object moves relative to the modified shape boundary, the authoring tool 110 updates the shape boundaries, which are recorded and stored in Step 2016.

In this embodiment, the shape boundaries and location are displayed for validation in the authoring tool 110 in Step 2018. The author inputs any other corresponding object metadata as discussed above in Step 2020 and the shape data is stored in Step 2022. Finally, in step 2024, the shape data is compiled and exported into the portable package.

Using the shape boundary 148 of the object, the system can utilize predicative coding to identify the object. As one example, if the system scans the video file and identifies a red octagon, the system may then further scan within the boundary for white pixels. If detected, the system could tag the object as a stop sign or prompt the author to confirm the object as a stop sign. In a similar fashion, the authoring tool 110 may include an object library (not shown) that includes objects that have been previously identified. The system could cross-reference the library for similar shapes and preliminarily tag the objects based on the results. Alternatively, the system could prompt the user to confirm the object. For example, if a Coca-Cola® can has been identified previously, the authoring tool 110 may scan the video file, detect a red, rectangular looking object and then compare it to the object library. If it sufficiently matches the Coca-Cola® can, it can tag the object accordingly. The authoring tool 110 can use commercially available predicative coding algorithms to perform the learning and such algorithms are known to those of ordinary skill.

Figure 34:
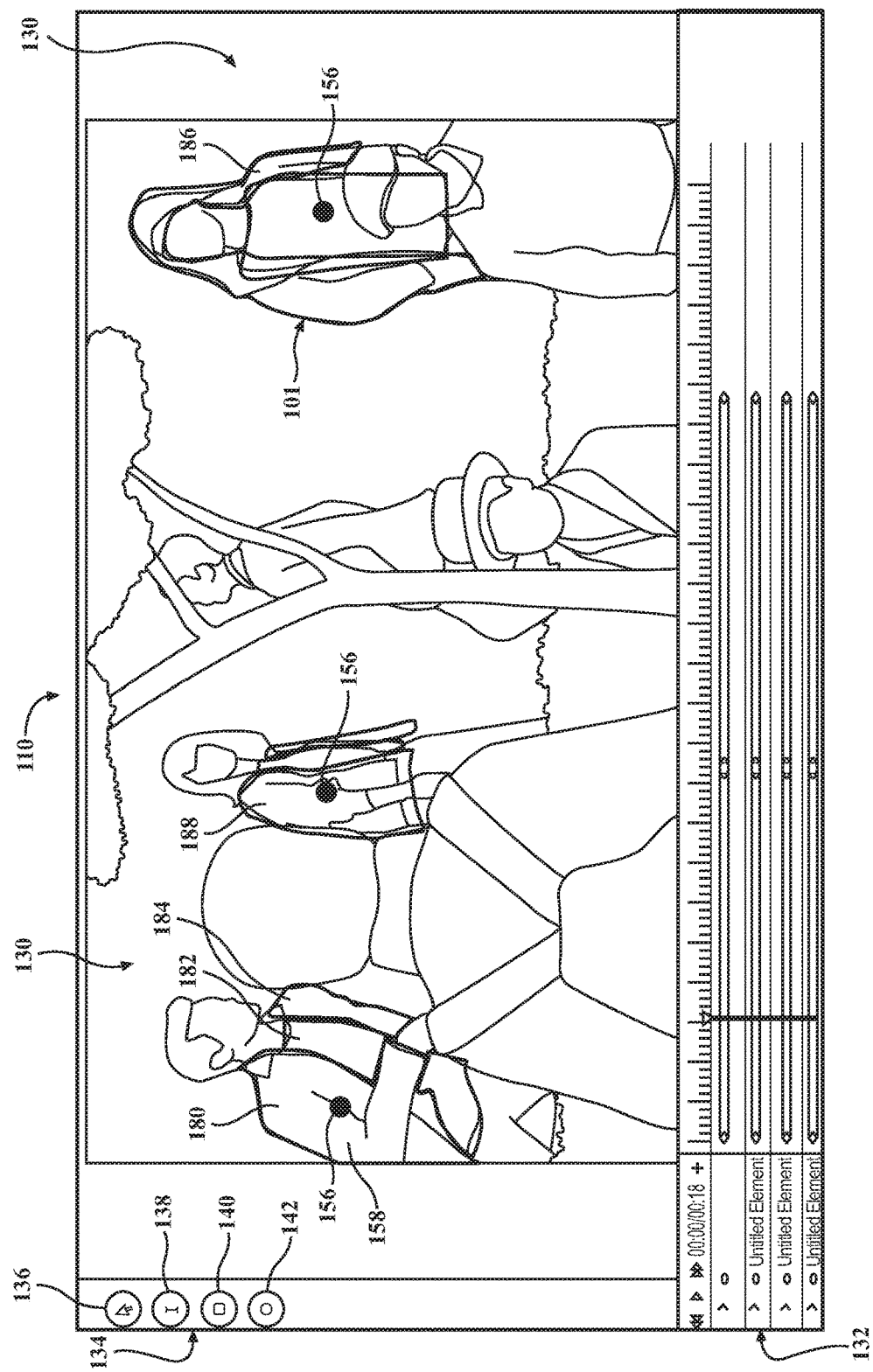
FIG. 34-36 are illustrations of yet still another embodiment of an authoring tool for creating interactive elements that correspond to objects in the media content.
Figure 35:
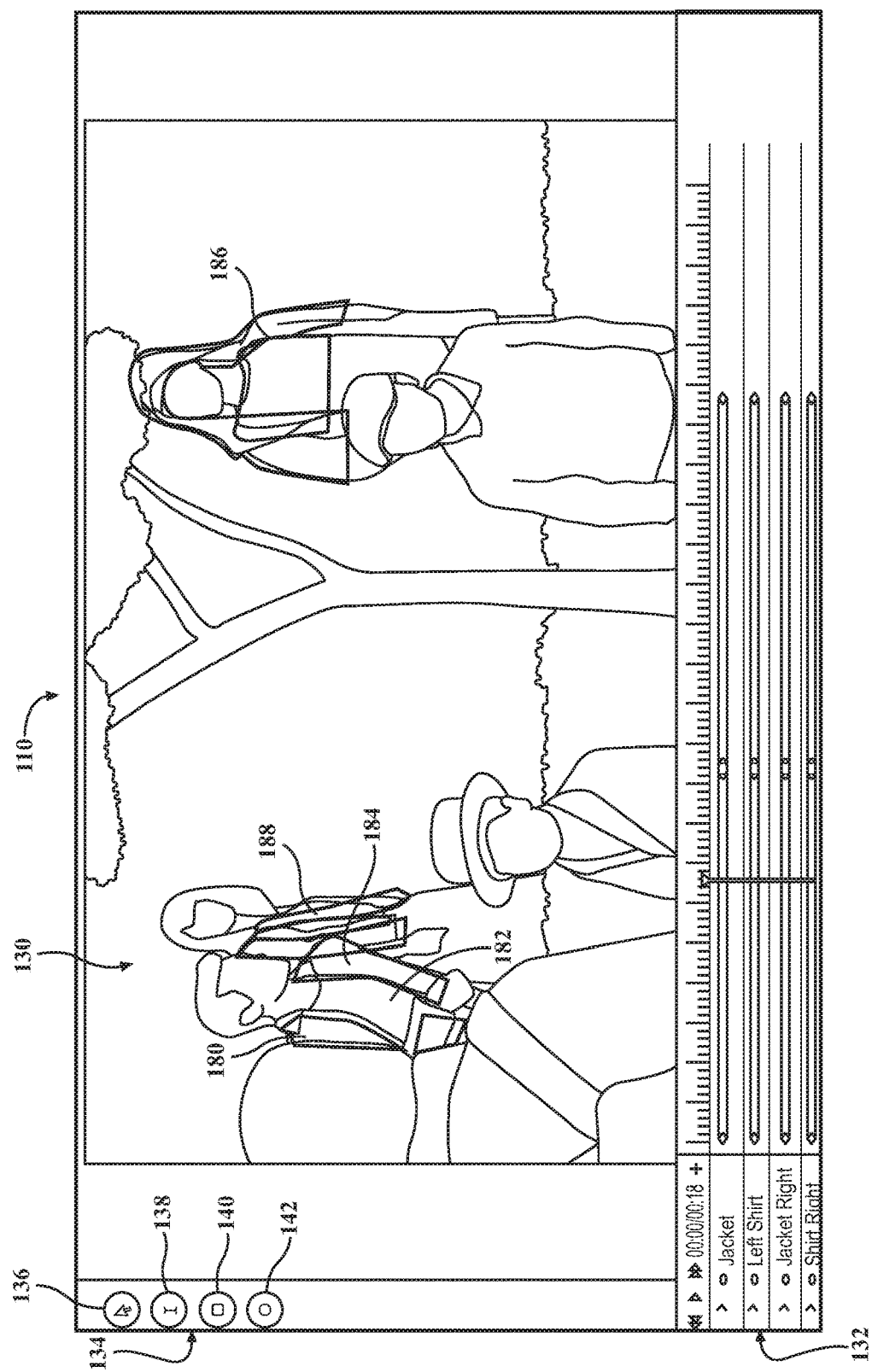
Figure 36:
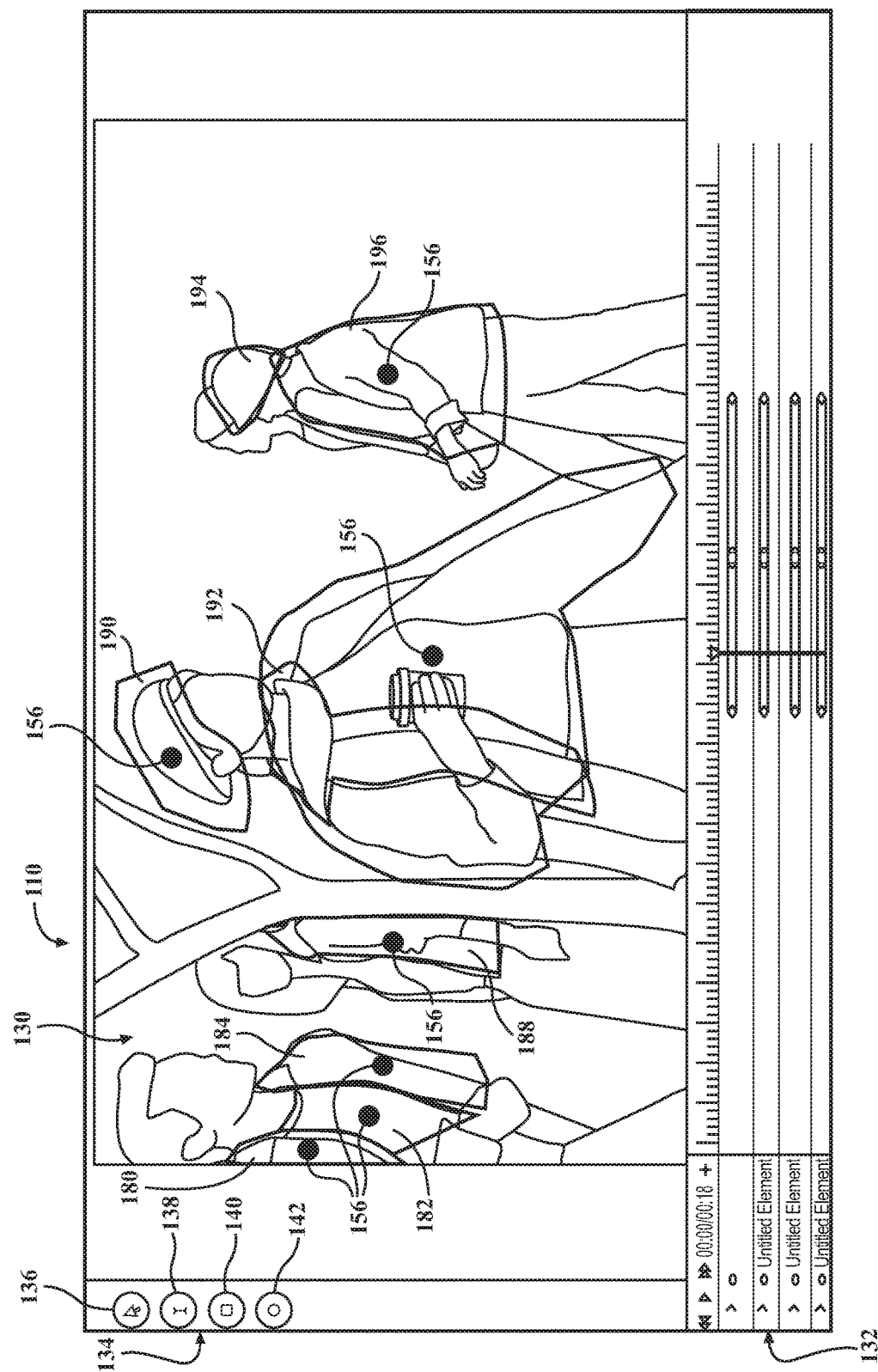

FIGS. 34-36 illustrate still another embodiment of the authoring tool 110 wherein the interactive elements 101 are identified and created as discussed above and automatically tracked during the video sequence. In FIG. 34, the interactive elements 101 are shown for three objects on one person 180, 182, 184, and two jackets 186, 188 on two other people. In FIG. 35, the authoring tool 110 is following the objects 180, 182, 184, 186, 188 and moving the interactive elements 101 as the video progress as discussed above by monitoring the observation focus. In FIG. 36, other objects 190, 192, 194, 196, have appeared and the authoring tool 110 has automatically created the interactive element 101 and added it. In the authoring tool automatic mode, the center point 156 may also utilized by the scanning process to further reduce the field of view when determining movement of objects within the shape boundaries. In other words, the authoring tool 110 may combine the center point 156 monitoring with the modified shape boundary, so that the authoring tool 110 does not have to monitor the entire field of view, it can just monitor the shape and redefine the shape it is detects movement.

The center point 156 monitoring also allows the authoring tool 110 to estimate a path of movement of the object. For example, if the object to be defined is a door, the authoring tool 110 can detect a lighter or a different color around the door. The authoring tool 110 can monitor the shape tolerance around the door and confirm that the shape is the door. Next, the authoring tool 110 determines the center point 156 of the door and monitors the movement of the center point 156 within the observation focus. The authoring tool 110 can also utilize the artificial intelligence to recognize components of the door, such as a door handle, hinges, and the like. The authoring tool 110 can determine what and where the door can potentially move based on the location of the components.

The subject invention also encodes the video file into various formats to match the video format requested by the device and the device specifications. Each of these formats are designed to adapt to the requirements of the calling application, i.e. if the device is a web browser on a desktop or if it is a web browser on a mobile device. The video may be streamed to the device and tuned to progressively, or in-stream encode the video playback, and adapt to very latent data transfer conditions, allowing for smooth video display/interactivity. Examples of the video formats encoded into four deployment types are: 1) web/desktop, 2) web/desktop alternate (for legacy), 3) mobile, and 4) mobile alternate (for legacy).

In addition to encoding the video file for distribution, after the interactive elements 101 have been created, modified, linked and stored, the portable package, or package file, is created. The package file collects the element parameters for each shape for the interactive elements 101 corresponding to the desired objects in the video file, which may be stored as representative code. The code may be any suitable format for allowing quick parsing through the established element parameters and for embedding with the industry standard specifications for the customer viewer 102. However, the element parameters may be captured according to other suitable methods. It is to be appreciated that the term "file" as used herein is to be understood broadly as any digital resource for storing information, which is available to a computer process and remains available for use after the computer process has finished.

A separate package file is created for each unique media content that is authored in the authoring tool 110. The authoring tool 110 generates the package file as the data file that could be any available format that can be executed by the viewer or viewer application server 120. Illustrative formats includes XML or JSON. JSON is known as a highly compressed version of XML. A sample of a representative portable package is shown in FIG. 37 as an XML file. The XML file includes the object information and element parameters associated with the interactive element 101, including any modified object position data and/or time. The portable package also include the default resolution. For example, FIG. 37 includes name of the interactive shape name, the landing URL, the logo file, the starting (X, Y) coordinate points, a time shift and the new (X, Y) coordinate points, and an end time. It is to be appreciated that FIG. 37 is representative of a basic example and is not intended to be limiting in any manner.

The customer viewer 102 is deployed to the user device with an interceptor that overlies a viewing pane 164 of the customer viewer 102. The viewing pane is where the media content is displayed. The interceptor may not be visible to the user. The interceptor is a clear applet or layer that detects the selection event from the user. In most standard viewers, when the user clicks within the viewing pane 164, the media content starts or stops. The subject invention is able to intercept and/or trap a timestamp and coordinates for the selection event for further processing. The interceptor captures any click or selection events (Selection Event Parameters) within the viewing pane 164 itself. If any selection events are detected, the location and timestamp of the click or selection event are logged. The interceptor may also display standard start, stop, pause or other playback commands 166 so that the user may interact more traditionally with the media content.

The user device that displays the media content to the user may employ various forms of allowing the user to select the object. For example, the selection event may be further defined as a click event, a touch event, voice event or any other suitable event representing the user's intent to select the object. The selection event may be registered according to any suitable technique.

In response to the selection event being detected, the package file is accessed or parsed. The package file may be local to the viewer or located on the viewer application server 120. In one embodiment, the package file is processed to determine if it corresponds with any interactive element 101. The package file is parsed for any element parameters that have a timestamp duration that includes the timestamp that was logged during the click or selection event. If a corresponding timestamp is discovered, the coordinates of the logged click or selection event is compared to the shape of the element parameter from the package file to determine if the logged click or selection event information is located inside or outside of the element parameter information.

If the logged click or selection event is located inside of the shape boundary 148, the corresponding object information events are processed. These include calling more assets for display, pause the video playback, redirect events, etc. If no corresponding object information is found, nothing is processed. In all cases, the logged click or selection event, along with any resulting event information, are accumulated by the viewer and eventually passed back for analytics processing. The analytics can be provided to an appropriate third party or the package server as needed.

Figure 38:
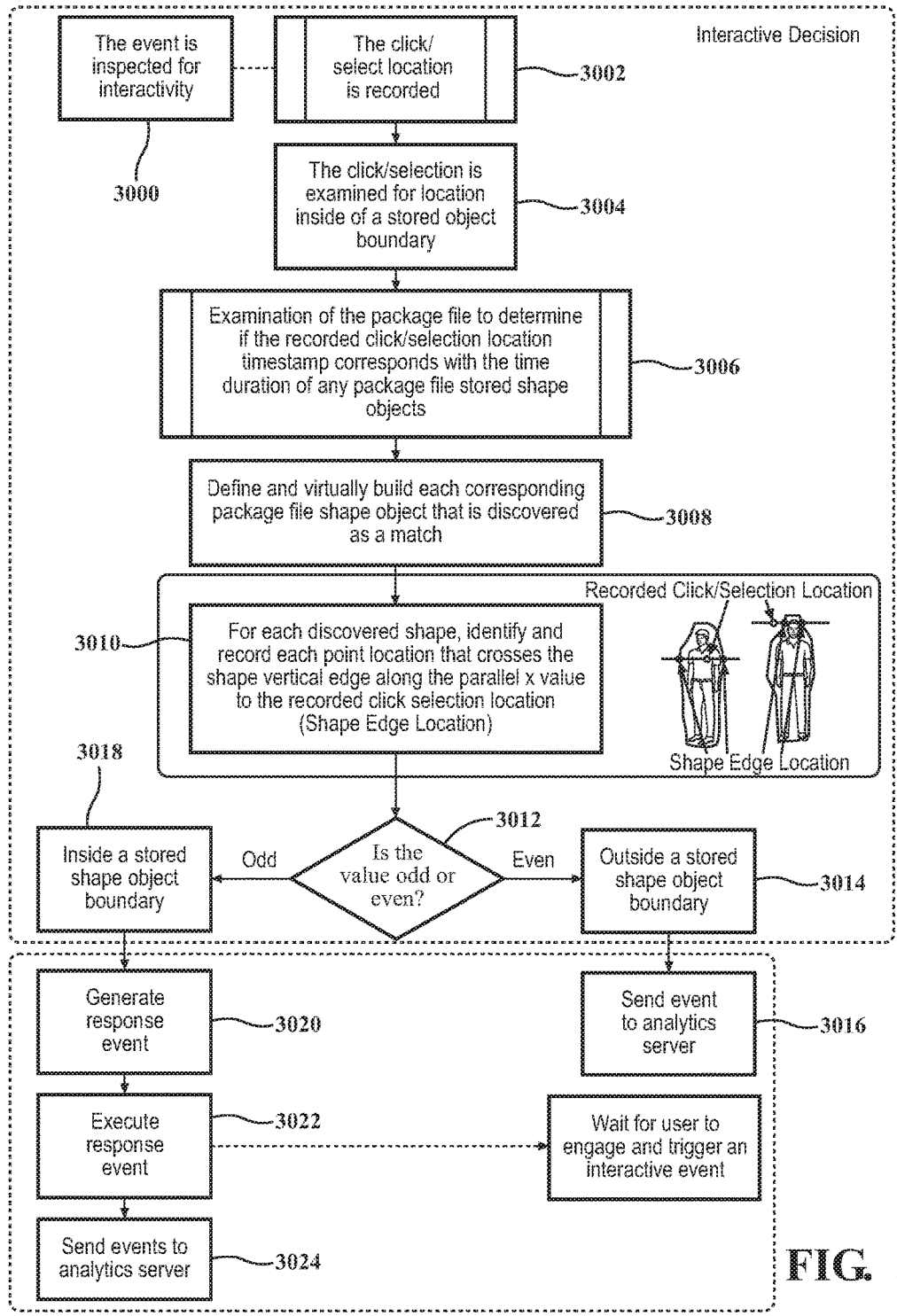
FIG. 38 is a flow chart of one embodiment for determining if an interactive element was located at a selection event.

Referring to FIG. 38, an exemplary flowchart is shown for determining whether the selection event was within the shape 148 as Step 3000. In Step 3002, the selection event is recorded. The selection event is examined to determine if the location is inside the shape boundary 148 in Step 3004. As discussed above, the package file is examined in Step 3006 for the timestamp that corresponds with the time duration for the interactive elements 101. If there is a corresponding timestamp, for any of the interactive elements 101 that could be present, the shape boundaries are defined or reviewed in Step 3008. In order to determine which, if any, interactive elements 101 the selection event was triggering, a horizontal line is drawn through the (X, Y) coordinate of the selection event in Step 3010.

It is to be appreciated that the subject invention is performed within devices and in software such that the references to "drawn" does not require an actual drawing, but instead are performed as operations and steps within the software on the devices. The above language is for descriptive purposes only, without being limiting, and provides an understanding to one of ordinary skill in the art of how the subject invention achieves the determination of where the selection event occurred relative to the interactive elements 101. After the horizontal line is drawn, the number of times the horizontal line passes through the boundary 148 of the interactive element 101 is determined in either or both of the directions. Step 3010 shows an example of the horizontal line drawn through the point of the selection event. In other words, the horizontal line can be inspected to the left of the selection event, the right of the selection even, or both. In one embodiment, it is only necessary to inspect in one direction from the selection event.

In order to determine if the selection event is within any of the interactive elements 101, the invention determines whether the number of boundaries encountered is odd or even when inspected from one direction, as in Step 3012. If the number is even, the invention proceeds to Step 3014, which indicates it is outside of the boundary 148 of the interactive element 101. In Step 3016, this selection event information is sent to the analytics server for further processing, which may include determining if the interactive elements 101 are not located properly (i.e. not in the correct spot), determining if a new interactive element 101 should be added, determining if the user is interested in another object present at that timestamp, etc.

If the number of object boundaries encountered is odd, this indicates that the selection event is within the boundary 148 of the interactive element 101, as shown in Step 3018. Once the selection event is confirmed as inside the interactive element 101, a response event is generated (i.e., recording that there is a section or click) in Step 3020, a response event is executed (i.e. taking whatever action is associated with interactive element) in Step 3022, and the events may be sent to the analytics servers in Step 3024. Next, the system returns to an idle state and waits for another selection event as in Step 3026.

In one embodiment according to the subject invention, the interactive elements 101 in the package file need to be adjusted to correspond to the user device. The interactive elements 101 may be adjusted based on orientation, scale, or aspect ratio of the user device. For example, if the user device is a mobile device, the user could view the media content in portrait or landscape mode. The different orientations of the user device may impact the display in the customer viewer 102 such that the interactive elements 101 would not align with the objects in the video. The user device could be a tablet that has a larger screen than a phone, but still smaller than a monitor for a computer. In one embodiment, in order for the subject invention to function properly, the customer viewer 102 or the viewer application server 120 has to scale the interactive elements of the package file. In order for the system to be responsive, scaling of the interactive elements 101 is preferably performed only in response detecting the selection event from the user. However, scaling can be performed when the package file is delivered irrespective of receiving a selection event. Typically, once the video is displayed in the viewer, the user can start and stop the video and the viewer also includes a notification that interactivity is available and also provides appropriate areas for the user to start/stop/pause the video.

In one embodiment, the customer viewer 102 scales the element parameters. In another embodiment, the viewer application server 120 receives the package file with the element parameters, the original video resolution, and the device information. The viewer application server 120 then parses the interactive elements 101 to correspond to where the objects are located in the video when displayed in the viewer on the user device.

In order to dynamically scale the element parameters, whether in the customer view 102 or the viewer application server 120, as one example, the following example process for a letter box playback may be used:

Setting the Video Scale:

Solve: calculates the width and height based on aspect ratio width=height/(video width/video height)

height=width*(video width/video height)

Resize: resizes a Point based on video dimensions original aspect ratio=video width/video height aspect ratio=x/x(Author Tool default)

if original aspect ratio is less than the aspect ratio newwidth=Solve(height(480),video width,video height)

newheight=Solve(width(640),video width,video height)

posX=640−[320+(newwidth/2)]

if original aspect ratio is greater than the aspect ratio newwidth=Solve(newheight,video width,video height)

newheight=Solve(width(640),video width,video height)

posY=480−[240+(newheight/2)]

NewSize$X$=newwidth/video width

NewSize$Y$=newheight/video height $x=(x*\text{NewSize}X)+(\text{pos}X-10)$ $y=(y*\text{NewSize}Y)+[\text{pox}Y-(\text{newheight}/7)]$ One of ordinary skill in the art appreciates that the above example would be modified for different types of playback. Additionally, if the playback will always be at a specified resolution and/or orientation, the scaling can be at a preset scale and the package file would be delivered accordingly. In other words, the package file would not be scaled each time it is accessed as in the dynamic scaling. One particular advantage of the subject invention is that the portable package can be distributed to remote systems, and once deployed, it does not need to communicate back to the portable package server 100 to be functional. There is no need for the data to make a round trip back to the portable package server 100 to produce interactivity. Of course, the analytics data could be sent back to the analytics server or to any other third party without deviating from the subject invention. Further, because the subject invention can be completely localized, basic modifications can be made to the code for deployment for specific environments.

During playback in the customer viewer 102, an icon 168 may be disposed in the viewing pane 164 to indicate to the user that interactive elements 101 are available to be selected. The user may use any inputs or controls to select either one of the icons or the interactive elements 101.

The additional information for the object may become viewable to the user according to any suitable manner. Once the interactive element 101 is selected, the media content may be stopped and the information may then be displayed or the media content may continue to play while the information is displayed. In either scenario, the information may be displayed in any one of the customer viewer 102 and a window separate from the customer viewer 102.

Figure 39:
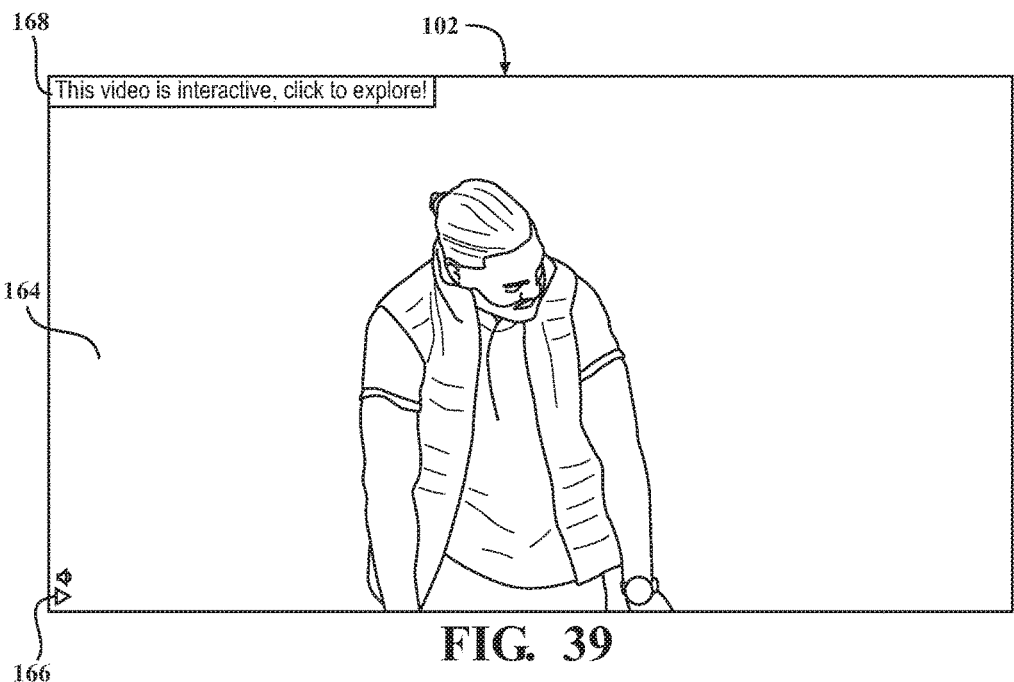
FIGS. 39-40 are schematic representations of a customer viewer displaying media content with interactivity.
Figure 40:
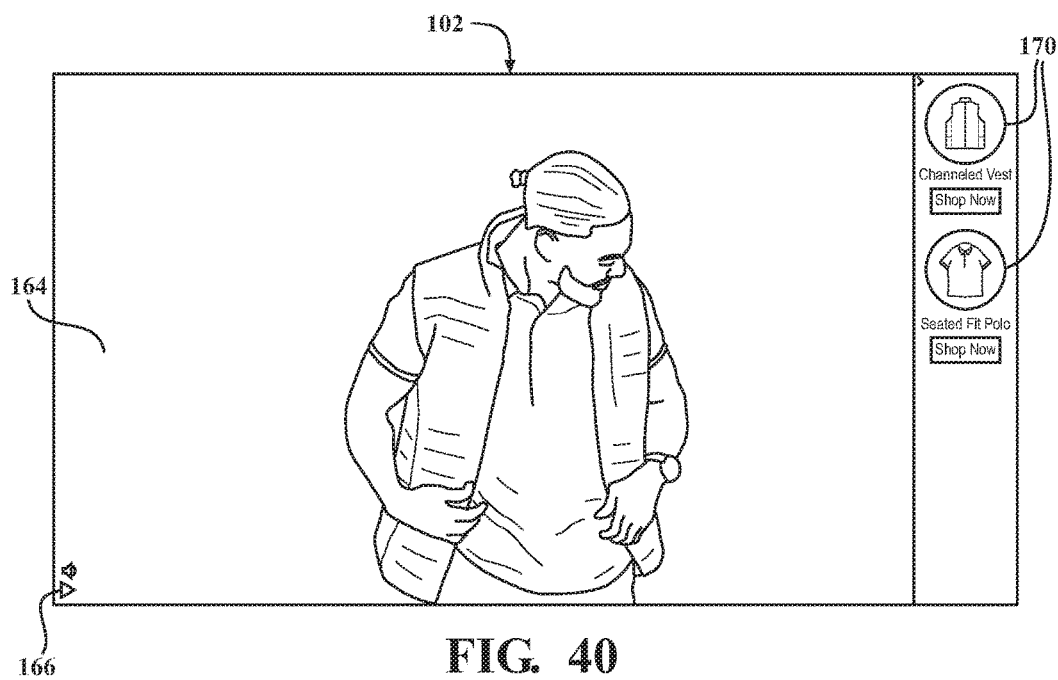

For instance, as shown in FIG. 39, the customer viewer 102 has the icon 168 that the video has interactive elements 101 at the upper left corner. When the interactive elements 101 are selected, as shown in FIG. 40, the additional information 170 is viewable at the side of the customer viewer 102 such that the view of the media content is unobstructed. Alternatively, the additional information may become viewable directly within the customer viewer 102. The additional information may be displayed in at least one of the customer viewer 102 and a window separate from the customer viewer 102.

The method may be beneficially used for gathering valuable data about the user's preferences. One advantage of the subject invention is that it allows for collecting interactivity between the user interacting with the interactive element 101 and another party, such as a provider, a manufacturer of the object, or the author of the authoring tool 110. The subject invention can detect how often the objects are selected and this in turn would adjust the cost of advertising within the media content. Further, the collection of the user data may be retained for future interaction and may even allow for tailoring the interactive elements 101 to the individual user based upon past selections. The interactive elements 101 that are selected may also be tracked and transmitted for instantaneous feedback of the marketing and advertising. Another advantage of the subject invention is that it may be incorporated into existing systems without any additional hardware and minimal, if any, additional software.

The data related to the object selected may include what object was selected, when an object is selected, and how many times an object is selected. The method may employ any suitable technique for collecting such data. For example, the method may analyze the database and extract data related to element parameters, additional information linked to element parameters, and recorded selection events made in relation to particular element parameters.

The method may further include the step of tracking user preferences based upon the collected data. The method may be utilized to monitor user behavior or habits. The collected data may be analyzed for monitoring which user was viewing and for how long the user viewed the object or the media content. The collected data may be referenced for a variety of purposes. For instance, the element parameters may be updated with the additional information that is specifically tailored to the behavior or habits of the user determined through analysis of the collected data related to the user's past selection events.

Another advantage of the subject invention is that various content distribution networks (CDN) can be used to distribute the portable package and it can be distributed utilizing industry standard advertising distribution environments such as DoubleClick, Centro and Sizmek. Because the subject invention is self-contained and includes all elements necessary for interactivity, it can be used with third parties that will not allow communication outside of their approved servers. Many of the related art systems require round trip communication for interactivity which are not supported by such third parties.

Users that access the CDN can retrieve the portable package and the media content based on the user location and through servers that are associated with the particular CDN. The subject invention can utilize the user location and connect this with the object information to provide more relevant information. For example, if the user selects a clothing item as the interactive element 101, the system can correlate the user location with local stores that can provide the clothing item. Alternatively, if the user location is such that a particular online supplier is preferred over another (such as due to local restrictions), the system can provide object information for that particular online supplier.

The system can also combine the artificial intelligence with the user's location and selection event history to provide more accurate and helpful search results. As discussed above, if the user clicks on the interactive elements 101, the information is displayed. But since the system knows the user location and other user data, such as age group, income, etc., the system can provide multiple ways for the user to purchase the object that are tailored to that user.

While the invention has been described with reference to an exemplary embodiment, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A method for providing additional information associated with an object visually present in media content when interacted with by a user on a user device, said method comprising the steps of:
   receiving media content in an authoring tool that is capable of receiving input from an author to create interactivity for objects visually present in the media content;
   defining a default resolution to import the media content into the authoring tool;
   scaling the media content within the authoring tool to display at the default resolution so that the authoring tool and media content have a 1:1 correspondence for a coordinate grid;
   establishing an interactive element corresponding to an object visually present in the media content, wherein the interactive element is defined by element parameters, the element parameters comprise a plurality of (X, Y) coordinates that define a shape and an object time corresponding to a duration that the shape is present at the coordinates;
   establishing object metadata for the object and associating the object metadata with the interactive element;
   creating a portable package that includes the default resolution, the element parameters and the object metadata;
   distributing the portable package to be retrievable by the user device in response to a request from the user device;
   receiving a request from the user device for the portable package and receiving device information including at least one of a type of the user device, a device orientation, a device resolution or combinations thereof;
   delivering the portable package and the media content to the user device based on the request;
   receiving a selection event from within a customer viewer on the user device that comprises a selection time and a selection coordinate;
   scaling the element parameters for the interactive element based on the device information;
   parsing the portable package to determine whether the selection time corresponds to the object time, and if the selection time corresponds with the object time, further parsing the portable package to determine whether the selection coordinate is within the scaled element parameters; and
   retrieving the object metadata if the selection coordinates are within the scaled element parameters such that the additional information is displayable to the user on the user device.

2. A method as set forth in claim 1 wherein the step of establishing the interactive element further comprises establishing a shape tolerance to define a modified shape boundary.

3. A method as set forth in claim 2 wherein the shape tolerance is a minimum of a 10% increase of an area of the shape.

4. A method as set forth in claim 2 further including the step of defining an observation focus that corresponds to the modified shape boundary and monitoring the observation focus for movement of the object therein.

5. A method as set forth in claim 4 further comprising the step of establishing new element parameters in response to detecting movement within the observation focus and updating the observation focus with the new element parameters.

6. A method as set forth in claim 5 wherein the new element parameters include new (X, Y) coordinates and a new object time.

7. A method as set forth in claim 1 further including the step of establishing an interceptor cooperating with the customer viewer to intercept selection events by the user.

8. A method as set forth in claim 1 wherein the step of further parsing the portable package to determine whether the selection coordinate is within the element parameters is further defined as establishing a vertical line through the selection coordinate and determining a number of shape boundaries that are intersected by the vertical line.

9. A method as set forth in claim 8 further including the step of determining if the selection event is within the interactive element in response to intersecting an odd number of shape boundaries when moved away in one direction from the selection event.

10. A method as set forth in claim 1 further including the step of defining a center point for the shape and monitoring the center point as the media content progresses.

11. A method as set forth in claim 10 wherein the center point is selectable from within the authoring tool to relocate the shape.

12. A method as set forth in claim 10 further including the step of estimating a path of movement for the object based on monitoring the center point.

13. A method as set forth in claim 1 wherein the additional information includes advertising information related to the object, wherein the step of retrieving the object metadata is further defined as displaying the advertising information on the user device.

14. A method as set forth in claim 1 wherein the step of retrieving the object metadata is further defined as displaying the additional information in at least one of the customer viewer and a window separate from the customer viewer.

15. A method as set forth in claim 1 wherein the step of receiving the device information is further defined as receiving the device information at a viewer application server and the view application server scales the interactive elements.

* * * * *